United States Patent
Scordilis-Kelley et al.

(10) Patent No.: US 10,854,921 B2
(45) Date of Patent: *Dec. 1, 2020

(54) ELECTROCHEMICAL CELL INCLUDING ELECTROLYTE HAVING INSOLUBLE NITROGEN-CONTAINING MATERIAL AND BATTERY INCLUDING THE CELL

(71) Applicant: Sion Power Corporation, Tucson, AZ (US)

(72) Inventors: Chariclea Scordilis-Kelley, Tucson, AZ (US); Joseph Kubicki, San Diego, CA (US); Shuguang Cao, Saratoga, CA (US); Yuriy V. Mikhaylik, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 138 days.

This patent is subject to a terminal disclaimer.

(21) Appl. No.: 15/844,382

(22) Filed: Dec. 15, 2017

(65) Prior Publication Data

US 2018/0108946 A1    Apr. 19, 2018

Related U.S. Application Data

(63) Continuation of application No. 14/286,731, filed on May 23, 2014, now Pat. No. 9,847,550, which is a
(Continued)

(51) Int. Cl.
*H01M 10/0567* (2010.01)
*H01M 4/62* (2006.01)
(Continued)

(52) U.S. Cl.
CPC ....... *H01M 10/0567* (2013.01); *H01M 4/382* (2013.01); *H01M 4/581* (2013.01);
(Continued)

(58) Field of Classification Search
CPC ........ H01M 4/62; H01M 4/382; H01M 4/581; H01M 10/0525; H01M 10/0567; H01M 10/4235; H01M 10/052
(Continued)

(56) References Cited

U.S. PATENT DOCUMENTS 3,350,239 A    10/1967  Douchan
3,915,743 A    10/1975  Lauck
(Continued)

FOREIGN PATENT DOCUMENTS

CN    1247639    3/2000
CN    1391305    1/2003
(Continued)

OTHER PUBLICATIONS

USPTO; Requirement for Restriction dated Aug. 30, 2018 in U.S. Appl. No. 15/409,410.
(Continued)

*Primary Examiner* — Sean P Cullen
(74) *Attorney, Agent, or Firm* — Snell & Wilmer L.L.P.

(57) ABSTRACT

An electrochemical cell including at least one nitrogen-containing compound is disclosed. The at least one nitrogen-containing compound may form part of or be included in: an anode structure, a cathode structure, an electrolyte and/or a separator of the electrochemical cell. Also disclosed is a battery including the electrochemical cell.

20 Claims, 4 Drawing Sheets

Related U.S. Application Data continuation of application No. 13/227,427, filed on Sep. 7, 2011, now Pat. No. 8,735,002.

(51) Int. Cl.
| | |
|---|---|
| *H01M 4/38* | (2006.01) |
| *H01M 4/58* | (2010.01) |
| *H01M 10/0525* | (2010.01) |
| *H01M 10/42* | (2006.01) |
| *H01M 10/052* | (2010.01) |
| *H01M 4/134* | (2010.01) |
| *H01M 4/136* | (2010.01) |

(52) U.S. Cl.
CPC .......... *H01M 4/62* (2013.01); *H01M 10/052* (2013.01); *H01M 10/0525* (2013.01); *H01M 10/4235* (2013.01); *H01M 4/134* (2013.01); *H01M 4/136* (2013.01)

(58) Field of Classification Search
USPC .......................... 429/156, 163, 188, 314
See application file for complete search history.

(56) References Cited

U.S. PATENT DOCUMENTS

| | | | |
|---|---|---|---|
| 4,069,375 A | 1/1978 | Lauck | |
| 4,104,451 A | 8/1978 | Klemann et al. | |
| 4,162,202 A | 7/1979 | Dey | |
| 4,238,721 A | 12/1980 | DeLuca | |
| 4,264,689 A | 4/1981 | Moses | |
| 4,324,846 A | 4/1982 | Kaun | |
| 4,410,609 A | 10/1983 | Peled et al. | |
| 4,816,358 A | 3/1989 | Holleck et al. | |
| 4,857,423 A | 8/1989 | Abraham et al. | |
| 4,925,749 A | 5/1990 | Wright | |
| 4,981,672 A | 1/1991 | Neufville et al. | |
| 5,021,308 A | 6/1991 | Armand et al. | |
| 5,037,712 A | 8/1991 | Shackle et al. | |
| 5,112,704 A | 5/1992 | Furukawa et al. | |
| 5,277,514 A | 1/1994 | Glickman | |
| 5,314,765 A | 5/1994 | Bates | |
| 5,352,967 A | 10/1994 | Nutz et al. | |
| 5,387,479 A | 2/1995 | Koksbang | |
| 5,415,954 A | 5/1995 | Belanger | |
| 5,429,891 A | 7/1995 | Gozdz et al. | |
| 5,435,054 A | 7/1995 | Tonder et al. | |
| 5,436,091 A | 7/1995 | Shackle et al. | |
| 5,462,566 A | 10/1995 | Skotheim | |
| 5,514,493 A | 5/1996 | Waddell et al. | |
| 5,522,955 A | 6/1996 | Brodd | |
| 5,529,860 A | 6/1996 | Skotheim et al. | |
| 5,538,812 A | 7/1996 | Lee et al. | |
| 5,569,520 A | 10/1996 | Bates | |
| 5,580,684 A | 12/1996 | Yokoyama et al. | |
| 5,601,947 A | 2/1997 | Skotheim et al. | |
| 5,681,615 A | 2/1997 | Affinito et al. | |
| 5,648,187 A | 7/1997 | Skotheim et al. | |
| 5,686,201 A | 11/1997 | Chu | |
| 5,690,702 A | 11/1997 | Skotheim et al. | |
| 5,723,230 A | 3/1998 | Naoi et al. | |
| 5,731,104 A | 3/1998 | Ventura et al. | |
| 5,783,330 A | 7/1998 | Naoi et al. | |
| 5,792,575 A | 8/1998 | Naoi et al. | |
| 5,800,939 A | 9/1998 | Mishina et al. | |
| 5,824,434 A | 10/1998 | Kawakami et al. | |
| 5,882,812 A | 3/1999 | Visco et al. | |
| 5,882,819 A | 3/1999 | Naoi et al. | |
| 5,888,672 A | 3/1999 | Gustafson et al. | |
| 5,900,718 A | 5/1999 | Tsenter | |
| 5,919,587 A | 7/1999 | Mukherjee et al. | |
| 5,935,724 A | 8/1999 | Spillman et al. | |
| 5,935,728 A | 8/1999 | Spillman et al. | |
| 5,961,672 A | 10/1999 | Skotheim et al. | |
| 6,017,651 A | 1/2000 | Nimon et al. | |
| 6,025,094 A | 2/2000 | Visco et al. | |
| 6,027,827 A | 2/2000 | Gan et al. | |
| 6,030,720 A | 2/2000 | Chu | |
| 6,030,726 A | 2/2000 | Takeuchi et al. | |
| 6,060,184 A | 5/2000 | Gan et al. | |
| 6,110,619 A | 8/2000 | Zhang et al. | |
| 6,117,590 A | 9/2000 | Skotheim et al. | |
| 6,117,593 A | 9/2000 | Stachoviak | |
| 6,136,464 A | 10/2000 | Wakabe et al. | |
| 6,136,477 A | 10/2000 | Gan et al. | |
| 6,153,337 A | 11/2000 | Carlson | |
| 6,168,884 B1 | 1/2001 | Neudecker et al. | |
| 6,183,901 B1 | 2/2001 | Ying et al. | |
| 6,190,426 B1 | 2/2001 | Thibault et al. | |
| 6,194,099 B1 | 2/2001 | Geronov et al. | |
| 6,201,100 B1 | 3/2001 | Gorkovenko et al. | |
| 6,210,831 B1 * | 4/2001 | Gorkovenko | H01M 4/0485 429/213 |
| 6,210,836 B1 | 4/2001 | Takada et al. | |
| 6,210,839 B1 | 4/2001 | Gan et al. | |
| 6,218,054 B1 | 4/2001 | Webber | |
| 6,225,002 B1 | 5/2001 | Nimon et al. | |
| 6,238,821 B1 | 5/2001 | Mukherjee et al. | |
| 6,296,967 B1 | 10/2001 | Jacobs et al. | |
| 6,306,545 B1 | 10/2001 | Carlson et al. | |
| 6,329,789 B1 | 12/2001 | Gavrilov et al. | |
| 6,402,795 B1 | 6/2002 | Chu et al. | |
| 6,406,815 B1 | 6/2002 | Sandberg et al. | |
| 6,413,285 B1 | 7/2002 | Chu et al. | |
| 6,432,584 B1 | 8/2002 | Visco et al. | |
| 6,436,583 B1 | 8/2002 | Mikhaylik | |
| 6,632,573 B1 | 10/2003 | Nimon et al. | |
| 6,664,006 B1 | 12/2003 | Munshi | |
| 6,683,440 B2 | 1/2004 | Kawakami et al. | |
| 6,716,372 B2 | 4/2004 | Barker et al. | |
| 6,733,924 B1 | 5/2004 | Skotheim et al. | |
| 6,797,428 B1 | 9/2004 | Skotheim et al. | |
| 6,835,495 B2 | 12/2004 | Michot et al. | |
| 6,882,130 B2 | 4/2005 | Handa et al. | |
| 6,902,848 B1 | 6/2005 | Izuchi | |
| 6,936,381 B2 | 8/2005 | Skotheim et al. | |
| 7,247,408 B2 | 7/2007 | Skotheim et al. | |
| 7,250,233 B2 | 7/2007 | Choi et al. | |
| 7,276,218 B2 | 10/2007 | Barker et al. | |
| 7,282,295 B2 | 10/2007 | Visco et al. | |
| 7,316,868 B2 | 1/2008 | Gorkovenko | |
| 7,354,680 B2 | 4/2008 | Mikhaylik | |
| 7,358,012 B2 | 4/2008 | Mikhaylik | |
| 7,553,590 B2 | 6/2009 | Mikhaylik | |
| 7,645,543 B2 | 1/2010 | Visco et al. | |
| 7,646,171 B2 | 1/2010 | Mikhaylik | |
| 7,771,870 B2 | 8/2010 | Affinito et al. | |
| 7,842,421 B2 | 11/2010 | Mikhaylik | |
| 8,197,971 B2 | 6/2012 | Skotheim et al. | |
| 8,735,002 B2 | 5/2014 | Scordilis-Kelley et al. | |
| 8,748,043 B2 | 6/2014 | Mikhaylik | |
| 8,828,610 B2 | 9/2014 | Mikhaylik | |
| 9,577,289 B2 | 2/2017 | Liao et al. | |
| 9,716,291 B2 | 7/2017 | Mikhaylik | |
| 9,847,550 B2 | 12/2017 | Scordilis-Kelley | |
| 9,859,588 B2 | 1/2018 | Mikhaylik | |
| 10,297,827 B2 | 5/2019 | Scordilish-Kelley et al. | |
| 10,468,721 B2 | 11/2019 | Liao et al. | |
| 2002/0012846 A1 | 1/2002 | Skotheim et al. | |
| 2002/0034688 A1 | 3/2002 | Chu et al. | |
| 2002/0045102 A1 | 4/2002 | Jung et al. | |
| 2002/0092155 A1 * | 7/2002 | Carlson | H01M 10/052 29/623.5 |
| 2002/0106560 A1 | 8/2002 | Kolb et al. | |
| 2002/0122987 A1 | 9/2002 | Tamura et al. | |
| 2002/0192557 A1 | 12/2002 | Choi et al. | |
| 2003/0006735 A1 | 1/2003 | Kawakami et al. | |
| 2003/0036003 A1 * | 2/2003 | Shchori | H01M 2/145 429/303 |
| 2003/0082442 A1 | 5/2003 | Choi | |
| 2004/0048154 A1 | 3/2004 | Jung et al. | |
| 2004/0091776 A1 | 5/2004 | Hwang | |
| 2005/0064293 A1 | 3/2005 | Shen et al. | |
| 2005/0089793 A1 | 4/2005 | Kang et al. | |

(56) References Cited

U.S. PATENT DOCUMENTS

| | | | |
|---|---|---|---|
| 2005/0095504 A1* | 5/2005 | Kim | H01M 2/1673 429/246 |
| 2005/0147886 A1 | 7/2005 | Mikhaylik | |
| 2005/0156575 A1 | 7/2005 | Mikhaylik | |
| 2006/0068296 A1 | 3/2006 | Nakagawa et al. | |
| 2006/0208701 A1 | 9/2006 | Mikhaylik | |
| 2006/0292451 A1 | 12/2006 | Lee et al. | |
| 2007/0009805 A1 | 1/2007 | Wright et al. | |
| 2007/0082264 A1 | 4/2007 | Mikhaylik | |
| 2007/0202401 A1 | 8/2007 | Viavattine | |
| 2007/0212613 A1 | 9/2007 | Ishida | |
| 2007/0221265 A1 | 9/2007 | Affinito et al. | |
| 2008/0193835 A1* | 8/2008 | Mikhaylik | H01M 4/13 429/156 |
| 2008/0318128 A1 | 12/2008 | Simoneau et al. | |
| 2009/0053592 A1 | 2/2009 | Mino et al. | |
| 2009/0186263 A1 | 7/2009 | Posin | |
| 2009/0280410 A1 | 11/2009 | Zaguib et al. | |
| 2010/0129699 A1 | 5/2010 | Mikhaylik et al. | |
| 2011/0076572 A1 | 3/2011 | Amine et al. | |
| 2011/0183203 A1 | 7/2011 | Du et al. | |
| 2011/0287305 A1 | 11/2011 | Scordilis-Kelley et al. | |
| 2012/0070746 A1 | 3/2012 | Milchaylik et al. | |
| 2012/0171576 A1 | 7/2012 | Tsai et al. | |
| 2013/0017441 A1 | 1/2013 | Affinito | |
| 2013/0059193 A1 | 3/2013 | Scordilis-Kelley et al. | |
| 2014/0062411 A1 | 3/2014 | Mikhaylik | |
| 2017/0149089 A1 | 5/2017 | Liao | |
| 2018/0198164 A1 | 7/2018 | Milchaylik | |
| 2019/0207216 A1 | 7/2019 | Scordilis-Kelley et al. | |

FOREIGN PATENT DOCUMENTS

| | | |
|---|---|---|
| CN | 1435002 | 8/2003 |
| CN | 1482693 | 3/2004 |
| CN | 1511351 | 7/2004 |
| CN | 1612377 | 5/2005 |
| CN | 1925207 | 3/2007 |
| CN | 1930725 | 3/2007 |
| CN | 1983706 | 6/2007 |
| CN | 101145622 | 3/2008 |
| CN | 101212065 | 7/2008 |
| CN | 101438453 | 5/2009 |
| CN | 101752540 | 6/2010 |
| CN | 101834310 | 9/2010 |
| CN | 102569886 | 7/2012 |
| CN | 102569896 | 7/2012 |
| CN | 102598389 | 7/2012 |
| CN | 102751539 | 10/2012 |
| EP | 0281352 | 3/1988 |
| EP | 0406339 | 1/1991 |
| EP | 0529802 | 3/1993 |
| EP | 0689260 | 12/1995 |
| EP | 0875951 | 11/1998 |
| EP | 0924789 | 6/1999 |
| EP | 0971432 | 1/2000 |
| EP | 2309572 | 4/2011 |
| EP | 2333886 | 6/2011 |
| JP | 57147869 | 9/1982 |
| JP | S62213064 | 9/1987 |
| JP | 6238830 | 8/1994 |
| JP | 6275313 | 9/1994 |
| JP | 8279357 | 10/1996 |
| JP | 09017441 | 1/1997 |
| JP | 5-201733 | 8/1998 |
| JP | Hei. 5-201733 | 8/1998 |
| JP | 10-248175 | 9/1998 |
| JP | Hei. 10-248175 | 9/1998 |
| JP | 11040202 | 2/1999 |
| JP | 11067275 | 3/1999 |
| JP | 2000-30750 | 1/2000 |
| JP | 2000-311721 | 11/2000 |
| JP | 2001-520447 | 10/2001 |
| JP | 2002-135989 | 5/2002 |
| JP | 2003-123743 | 4/2003 |
| JP | 2003518713 | 6/2003 |
| JP | 2004103548 | 4/2004 |
| JP | 2005174653 | 6/2005 |
| JP | 2005197175 | 7/2005 |
| JP | 2006024415 | 1/2006 |
| JP | 2007518230 | 7/2007 |
| JP | 2009530796 | 8/2009 |
| JP | 2010067435 | 3/2010 |
| JP | 20100067435 | 3/2010 |
| JP | 2010511995 | 4/2010 |
| JP | 2010102895 | 5/2010 |
| JP | 2011510467 | 3/2011 |
| JP | 2011138675 | 7/2011 |
| JP | 2011204695 | 10/2011 |
| JP | 2014-518001 | 7/2014 |
| JP | 2019-024009 | 2/2019 |
| KR | 2004-0000129 | 1/2004 |
| KR | 20040011629 | 2/2004 |
| KR | 20040033678 | 4/2004 |
| KR | 20060127973 | 1/2013 |
| KR | 10-1890971 | 8/2018 |
| KR | 10-1890971 | 9/2018 |
| WO | 9744840 | 11/1997 |
| WO | 9903162 | 1/1999 |
| WO | 9919931 | 4/1999 |
| WO | 9933125 | 7/1999 |
| WO | 9933131 | 7/1999 |
| WO | 2000046870 | 8/2000 |
| WO | 0139303 | 5/2001 |
| WO | 0147088 | 6/2001 |
| WO | 2001057943 | 9/2001 |
| WO | 2002095849 | 11/2002 |
| WO | 2002067344 | 2/2005 |
| WO | 2005069404 | 7/2005 |
| WO | 2005069405 | 7/2005 |
| WO | 2005069409 | 7/2005 |
| WO | 2005083829 | 9/2005 |
| WO | 2005095504 | 10/2005 |
| WO | 2007111988 | 10/2007 |
| WO | 2008070059 | 6/2008 |
| WO | 2010047327 | 4/2010 |
| WO | 2012161989 | 11/2012 |
| WO | 2014099314 | 6/2014 |
| WO | 2014159279 | 10/2014 |
| WO | 2014159281 | 10/2014 |

OTHER PUBLICATIONS

CIPO; Fourth Office Action dated Aug. 27, 2018 in Application No. 201380066182.6.

JPO; Decision of Rejection dated Jul. 24, 2018 in Application No. 2016-252802.

KIPO; Notice of Allowance dated Jul. 20, 2018 in Application No. 2013-7034105.

CIPO; Notice of Decision to Grant Patent dated Sep. 5, 2018 in Application No. 201280025061.2.

USPTO; Notice of Allowance dated Dec. 19, 2018 in U.S. Appl. No. 13/114,944.

USPTO; Final Office Action dated Feb. 28, 2019 in U.S. Appl. No. 15/409,410.

USPTO; Non-Final Office Action dated Jun. 7, 2018 in U.S. Appl. No. 13/114,944.

EPO; Examination Report dated Sep. 26, 2017 in Application No. 14179039.4.

JPO; Decision of Rejection dated May 15, 2018 in Application No. 2015-547396.

EPO; Office Action dated Jan. 18, 2018 in Application No. 13863879.6.

KIPO; Office Action dated Feb. 27, 2018 in Application No. 2013-7034105.

CIPO; Sixth Office Action dated Apr. 4, 2018 in Application No. 201280025061.2.

USPTO; Office Action dated Aug. 14, 2015 in U.S. Appl. No. 13/114,944.

(56) References Cited

OTHER PUBLICATIONS

USPTO; Office Action dated Jan. 15, 2016 in U.S. Appl. No. 13/114,944.
USPTO; Restriction dated Dec. 8, 2014 in U.S. Appl. No. 13/797,281.
USPTO; Final Office Action dated Jul. 16, 2015 in U.S. Appl. No. 13/797,281.
USPTO; Office Action dated Mar. 11, 2015 in U.S. Appl. No. 13/797,281.
USPTO; Office Action dated Dec. 9, 2015 in U.S. Appl. No. 13/797,281.
USPTO; Restriction dated Aug. 1, 2016 in U.S. Appl. No. 14/298,640.
USPTO; Final Office Action dated Aug. 10, 2016 in U.S. Appl. No. 13/797,281.
USPTO; Final Office Action dated Sep. 14, 2016 in U.S. Appl. No. 14/286,731.
USPTO; Restriction Requirement dated Oct. 12, 2016 in U.S. Appl. No. 14/446,321.
USPTO; Office Action dated Oct. 25, 2016 in U.S. Appl. No. 14/298,640.
USPTO: Advisory Action dated Dec. 1, 2016 in U.S. Appl. No. 14/286,731.
USPTO; Office Action dated Dec. 29, 2016 in U.S. Appl. No. 14/446,321.
USPTO; Final Office Action dated Feb. 7, 2017 in U.S. Appl. No. 14/298,640.
USPTO; Office Action dated Feb. 23, 2017 in U.S. Appl. No. 14/286,731.
USPTO; Notice of Allowance dated Apr. 14, 2017 in U.S. Appl. No. 14/446,321.
USPTO; Office Action dated Apr. 28, 2017 in U.S. Appl. No. 13/114,944.
USPTO; Office Action dated May 31, 2016 in U.S. Appl. No. 14/286,731.
USPTO; Office Action dated May 22, 2017 in U.S. Appl. No. 14/298,640.
USPTO; Final Office Action dated Jun. 6, 2017 in U.S. Appl. No. 14/286,731.
USPTO; Notice of Allowance dated Aug. 18, 2017 in U.S. Appl. No. 14/286,731.
USPTO; Notice of Allowance dated Sep. 8, 2017 in U.S. Appl. No. 14/298,640.
USPTO; Final Office Action dated Sep. 8, 2017 in U.S. Appl. No. 13/114,944.
USPTO; Notice of Allowance dated Oct. 27, 2017 in U.S. Appl. No. 14/286,731.
CNPO; Office Action dated May 21, 2004 Application No. 00818169.
CNPO; Office Action dated Aug. 13, 2004 in Application No. 00818173.
CNPO; First Office Action dated Jun. 21, 2005 in Application No. 02810473.
CNPO; Second Office Action dated Nov. 24, 2005 in Application No. 02810473.
CNPO; Office Action dated Oct. 31, 2006 in Application No. 2005100790237.
CNPO; First Office Action dated Mar. 7, 2008 in Application No. 200580006955.
CNPO; Second Office Action dated Nov. 14, 2008 in Application No. 200580006955.
CNPO; Third Office Action dated May 8, 2009 in Application No. 200580006955.
CNPO; First Office Action dated Feb. 1, 2008 in Application No. 200580006959.
CNPO; Second Office Action dated Oct. 17, 2008 in Application No. 200580006959.
CNPO; Third Office Action dated May 8, 2009 in Application No. 200580006959.
CNPO; First Office Action dated Feb. 15, 2008 in Application No. 200580006966.
CNPO; Second Office Action dated Oct. 17, 2008 in Application No. 200580006966.
CNPO; First Office Action dated Jun. 6, 2008 in Application No. 200580008883.
CNPO; First Office Action dated Nov. 12, 2010 in Application No. 200780015114.
CNPO; Second Office Action dated Sep. 28, 2011 in Application No. 200780015114.
CNPO; Third Office Action dated May 9, 2012 in Application No. 200780015114.
CNPO; Fourth Office Action dated Nov. 15, 2012 in Application No. 200780015114.
CNPO; First Office Action dated Jun. 22, 2011 in Application No. 200910146153.
CNPO; First Office Action dated Nov. 17, 2010 in Application No. 201010157368.
CNPO; Office Action dated Oct. 9, 2011 in Application No. 201010157368.
CNPO; Notice on Reexamination dated Mar. 20, 2014 in Application No. 201010157368.
CNPO; Decision of Reexamination dated Jun. 26, 2014 in Application No. 201010157368.
CNPO; First Office Action dated Jul. 3, 2014 in Application No. 201210393052.6.
CIPO; 2nd Office Action dated May 7, 2015 in Application No. 201210396052.6.
CIPO; 3rd Office Action dated Nov. 16, 2015 in Application No. 201210396052.6.
CIPO; First Office Action dated Jun. 3, 2015 in Application No. 201280025061.2.
CIPO; Second Office Action dated Jan. 27, 2016 in Application No. 201280025061.1.
CIPO; Third Office action dated Aug. 8, 2016 in Application No. 201280025061.1.
CIPO; Third Office Action dated Jan. 22, 2018 in Application No. 201380066182.6.
JP; Second Office Action dated Aug. 4, 2016 in Application No. 2014512865.
JP; First Office Action dated Feb. 1, 2016 in Application No. 2014512865.
EPO; Office Action dated Oct. 9, 2002 in Application No. 00980746.
EPO; Office Action dated Apr. 21, 2004 in Application No. 02739419.
EPO; Search Report dated Sep. 9, 2008 in Application No. 05713328.2.
EPO; Office Action dated Feb. 21, 2008 in Application No. 05705253.2.
EPO; Office Action dated Feb. 18, 2010 in Application No. 05705253.2.
EPO; Office Action dated Jan. 28, 2011 in Application No. 05705253.2.
EPO; Office Action dated Feb. 4, 2010 in Application No. 05705255.
EPO; Office Action dated Feb. 8, 2011 in Application No. 07753817.
EPO; Office Action dated Aug. 4, 2011 in Application No. 07753817.
EPO; Search Report dated May 10, 2011 in Application No. 11155182.6.
EPO; Office Action dated Apr. 25, 2012 in Application No. 07753817.
Richardson et al., "Overcharge Protection for Rechargeable Lithium Polymer Electrolyte Batteries", J. Electrochem. Soc., vol. 143, pp. 3992-2996, (1996).
Chu et al., "High Performances S-type Cathode", Proceedings of the 12th Annual Battery Conference, applications and Advances, pp. 133-134, (1997).
Aurbach in Nonaqueous Electrochemistry, Chapter 6, pp. 289-366, Marcel Dekker, New York, (1999).
Cheon et al., "Rechargeable Lithium Sulfur Battery: II. Rate Capability and Cycle Characteristics", J. Electrochem. Soc., vol. 150, pp. A800-A805, (2003).
Zhuang et al., The Reaction of Lithium with Carbon Dioxide Studied by Photoelectron Spectroscopy Surface Science, (1998).
"Large Lithium Polymer Battery Development The Immobile Solvent Concept," Gauthier et al., J. Power Sources, vol. 54, pp. 163-169, (1995).
"Discharge Characteristics of Manganese Dioxide/Lithium Cells in Various Electrolyte Solutions," Nishio et al., J. Power Sources, vol. 55, pp. 115-117, (1995).

(56) References Cited

OTHER PUBLICATIONS

USPTO; Non-Final Office Action dated Nov. 2, 2018 in U.S. Appl. No. 15/409,410.
PCT; Written Opinion dated Mar. 18, 2014 in Application No. PCT/US2013/072174.
PCT; International Preliminary Report dated Jun. 23, 2015 in Application No. PCT/US2013/072174.
Mikhaylik et al., "Low Temperature Performance of Li/S Batteries," Journal of Electrochemical Society, vol. 150, pp. A306-A311, (2003). (Abstract Only).
JPO; Office Action dated Dec. 18, 2017 in Application No. 2016-252802.
USPTO; Supplemental Notice of Allowance dated Jan. 22, 2014 in U.S. Appl. No. 13/227,427.
KIPO; Office Action dated Nov. 18, 2019 in Application No. 2015-7018567.
EPO; Office Action dated Jun. 13, 2019 in Application No. 14773345.5.
EPO; Office Action dated Jul. 8, 2019 in Application No. 12723031.6.
EPO; Office Action dated Jul. 29, 2019 in Application No. 14179039.4.
EPO; Office Action dated Jul. 16, 2019 in Application No. 13863879.6.
EPO; Office Action dated Oct. 24, 2019 in Application No. 12723031.6.
JPO; Office Action dated Sep. 2, 2019 in Application No. 2018-172458.
USPTO; Office Action dated Jan. 30, 2003 in U.S. Appl. No. 09/721,519.
USPTO; Final Office Action dated Aug. 26, 2003 in U.S. Appl. No. 09/721,519.
USPTO; Notice of Allowance dated Dec. 16, 2003 in U.S. Appl. No. 09/721,519.
USPTO; Office Action dated Aug. 13, 2002 in U.S. Appl. No. 09/721,578.
USPTO; Office Action dated Jan. 29, 2003 in U.S. Appl. No. 09/721,578.
USPTO; Final Office Action dated Jul. 29, 2003 in U.S. Appl. No. 09/721,578.
USPTO; Advisory Action Oct. 28, 2003 in U.S. Appl. No. 09/721,578
USPTO; Office Action dated Jan. 7, 2004 in U.S. Appl. No. 09/721,578.
USPTO; Notice of Allowance dated Apr. 21, 2004 in U.S. Appl. No. 09/721,578.
USPTO; Office Action dated Oct. 14, 2003 in U.S. Appl. No. 09/864,890.
USPTO; Final Office Action dated Aug. 2, 2004 in U.S. Appl. No. 09/864,890.
USPTO; Office Action dated Apr. 21, 2005 in U.S. Appl. No. 09/864,890.
USPTO; Advisory Action dated Apr. 21, 2006 in U.S. Appl. No. 09/864,890.
USPTO; Notice of Allowance dated Mar. 19, 2007 in U.S. Appl. No. 09/864,890.
USPTO; Office Action dated Apr. 1, 2009 in U.S. Appl. No. 10/585,495.
USPTO; Final Office Action dated Apr. 26, 2010 in U.S. Appl. No. 10/585,495.
USPTO; Notice of Allowance dated Jul. 22, 2010 in U.S. Appl. No. 10/585,495.
USPTO; Office Action dated Jun. 11, 2010 in U.S. Appl. No. 10/585,496.
USPTO; Office Action dated Mar. 28, 2007 in U.S. Appl. No. 10/752,876.
USPTO; Office Action dated Aug. 1, 2007 in U.S. Appl. No. 10/752,876.
USPTO; Notice of Allowance dated Nov. 15, 2007 in U.S. Appl. No. 10/752,876.
USPTO; Office Action dated Mar. 23, 2007 in U.S. Appl. No. 10/753,031.
USPTO; Office Action dated Aug. 1, 2007 in U.S. Appl. No. 10/753,031.
USPTO; Notice of Allowance dated Nov. 23, 2007 in U.S. Appl. No. 10/753,031.
USPTO; Notice of Allowance dated Aug. 3, 2005 in U.S. Appl. No. 10/753,123.
USPTO; Office Action dated Mar. 1, 2007 in U.S. Appl. No. 10/779,102.
USPTO; Notice of Allowance dated Aug. 21, 2007 in U.S. Appl. No. 10/779,102.
USPTO; Office Action dated Oct. 15, 2004 in U.S. Appl. No. 10/913,839.
USPTO; Notice of Allowance dated Apr. 18, 2005 in U.S. Appl. No. 10/913,839.
USPTO; Office Action dated Dec. 10, 2008 in U.S. Appl. No. 11/388,643.
USPTO; Final Office Action dated Jun. 18, 2009 in U.S. Appl. No. 11/388,643.
USPTO; Notice of Allowance dated Sep. 4, 2009 in U.S. Appl. No. 11/388,643.
USPTO; Office Action dated Oct. 17, 2008 in U.S. Appl. No. 12/099,107.
USPTO; Notice of Allowance dated Feb. 27, 2009 in U.S. Appl. No. 12/099,107.
USPTO; Office Action dated Jan. 6, 2011 in U.S. Appl. No. 12/102,498.
USPTO; Office Action dated Feb. 24, 2011 in U.S. Appl. No. 12/102,498.
USPTO; Office Action dated Jun. 9, 2011 in U.S. Appl. No. 12/102,498.
USPTO; Final Office Action dated Oct. 9, 2013 in U.S. Appl. No. 12/102,498.
USPTO; NOA dated Mar. 18, 2014 in U.S. Appl. No. 12/102,498.
USPTO; Office Action dated Jul. 22, 2011 in U.S. Appl. No. 12/106,079.
USPTO; Office Action dated Jun. 25, 2013 in U.S. Appl. No. 12/102,498.
USPTO; Advisory Action dated Jan. 22, 2014 in U.S. Appl. No. 12/102,498.
USPTO; Office Action dated Oct. 18, 2011 in U.S. Appl. No. 12/106,079.
USPTO; Final Office Action dated Feb. 6, 2012 in U.S. Appl. No. 12/106,079.
USPTO; Advisory Action dated Apr. 13, 2012 in U.S. Appl. No. 12/106,079.
USPTO; Office Action dated Feb. 27, 2014 in U.S. Appl. No. 12/106,079.
USPTO; Notice of Allowance dated Jun. 12, 2014 in U.S. Appl. No. 12/106,079.
USPTO; Office Action dated Sep. 9, 2013 in U.S. Appl. No. 13/227,427.
USPTO; Final Office Action dated Jan. 7, 2014 in U.S. Appl. No. 13/227,427.
USPTO; Notice of Allowance dated Jan. 22, 2014 in U.S. Appl. No. 13/227,427.
USPTO; Supplemental Notice of Allowance dated Apr. 22, 2014 in U.S. Appl. No. 13/227,427.
USPTO; Office Action dated Oct. 2, 2013 in U.S. Appl. No. 13/114,944.
USPTO; Office Action dated Dec. 4, 2013 in U.S. Appl. No. 13/114,944.
EPO; Office Action dated Jan. 17, 2012 in Application No. 11155182.6.
EPO; Extended Search Report dated Nov. 17, 2014 in Application No. 2014179039.4.
EPO; Office Action dated May 30, 2016 in Application No. 12723031.6.
EPO; Supplementary Search Report dated Jul. 15, 2016 in Application No. 13863879.6.
EPO; 2nd Examination Report dated Jan. 19, 2018 in Application No. 2012723031.6.

(56) References Cited

OTHER PUBLICATIONS

JPO; Office Action dated Jan. 16, 2009 in Application No. 2002592213.
JPO; Office Action dated Jun. 2, 2011 in Application No. 2006-547630.
JPO; Office Action dated May 18, 2012 in Application No. 2006-547630.
JPO; Office Action dated Jun. 7, 2011 in Application No. 2006-547631.
JPO; Office Action dated May 25, 2012 in Application No. 2006-547631.
JPO; Office Action dated Nov. 2, 2011 in Application No. 2006-547632.
JPO; Office Action dated Jun. 17, 2011 in Application No. 2006-553246.
JPO; Office Action dated Aug. 29, 2012 in Application No. 2009-501574.
JPO; Office Action dated Mar. 4, 2014 in Application No. 2013-134849.
JPO; Office Action dated Aug. 14, 2017 in Application No. 2015-547396.
JPO; Office Action dated Nov. 14, 2017 in Application No. 2016-252802.
KIPO; Office Action dated Nov. 20, 2006 in Application No. 20027006627.
KIPO; Office Action dated Sep. 6, 2011 in Application No. 10-2006-7018371.
KIPO; Office Action dated Aug. 9, 2011 in Application No. 1020067015870.
KIPO; Office Action dated Aug. 9, 2011 in Application No. 1020067015871.
KIPO; Office Action dated Mar. 10, 2014 in Application No. 2013-7032012.
KIPO; Office Action dated Aug. 19, 2014 in Application No. 2014-7013037.
EPO; Office Action dated Arp. 25, 2012 in Application No. 07753817.
EPO; Office Action dated Feb. 14, 2013 in Application No. 07753817.
EPO; Office Action dated Aug. 6, 2013 in Application No. 07753817.
KIPO; Office Action dated Sep. 30, 2013 in Application No. 2008-7025640.
KIPO; Final Office Action dated Apr. 15, 2014 in Application No. 2008-7025640.
CIPO; First Office Action dated Nov. 8, 2016 in Application No. 201380066182.6.
CIPO; Fourth Office Action dated Feb. 27, 2017 in Application No. 201280025061.2.
CIPO; Second Office Action dated Jul. 18, 2017 in Application No. 201380066182.6.
CIPO; Fifth Office Action dated Sep. 25, 2017 in Application No. 201280025061.2.
PCT; International Search Report dated Apr. 28, 2006 in Application No. PCT/US2005/000493.
PCT; International Preliminary Report on Patentability and Written Opinion dated Jul. 10, 2006 in Application No. PCT/US2005/000493.
PCT; International Search Report dated Jun. 8, 2005 in Application No. PCT/US2005/000494.
PCT; International Preliminary Report on Patentability and Written Opinion dated Jul. 10, 2006 in Application No. PCT/US2005/000494.
PCT; International Search Report dated May 3, 2006 in Application No. PCT/US2005/000495.
PCT; International Preliminary Report on Patentability and Written Opinion dated Jul. 10, 2006 in Application No. PCT/US2005/000495
PCT; International Preliminary Report on Patentability dated Aug. 14, 2006 in Application No. PCT/US2005/04307.
PCT; International Search Report dated Sep. 5, 2008 in Application No. PCT/US2007/007219.
PCT; International Preliminary Report on Patentability and Written Opinion dated Sep. 23, 2008 in Application No. PCT/US2007/007219.
PCT; International Search Report dated Jun. 30, 1999 in Application No. PCT/US1999/03335.
PCT; International Search Report dated Feb. 16, 2001 in Application No. PCT/US2000/32234.
PCT; International Preliminary Examination Report dated Nov. 15, 2001 in Application No. PCT/US2000/32234.
PCT; International Search Report dated Oct. 28, 2003 in Application No. PCT/US2002/16649.
PCT; International Preliminary Examination Report dated Jan. 13, 2004 in Application No. PCT/US2002/16649.
PCT; International Search Report dated Aug. 22, 2012 in Application No. PCT/US2012/037635.
PCT; International Search Report dated Mar. 18, 2014 in Application No. PCT/US2013/072174.
PCT; International Premlinary Report on Patentability dated Mar. 10, 2014 in Application No. PCT/US2014/022821.
PCT; International Search Report and Written Opinion dated Mar. 10, 2014 in Application No. PCT/US2014/022821.
Peled et al., "The Electrochemical Behavior of Alkali and Alkaline Earth Metals in Nonaqueous Battery Systems", J. Electrochem. Soc., vol. 126, pp. 2047-2051, (1979).
Rao et al., "Effect of Sulfur Impurities on Li/TiS2 Cells", J. Electrochem. Soc., vol. 128, pp. 942945, (1981).
Peled et al., "Lithium-Sulfur Battery: Evaluation of Dioxolane-Based Electrolytes". J. Electrochem. Soc., vol. 136, pp. 1621-1625, (1989).
Narayanan et al., "Analysis of Redox Additive-Based Overcharge Protection for Rechargeable Lithium Batteries", J. Electrochem. Soc., vol. 138, pp. 2224-2229, (1991).
Golovin et al., "Applications of Metallocenes in Rechargeable Lithium Batteries for Overcharge Protection". J. Electrochem. Soc., vol. 139, pp. 5-10, (1992).
Alamgir et al., "Room Temperature Polymer Electrolytes", Industrial Chemistry Library, vol. 5, Lithium Batteries: New Materials, Developments and Perspectives, Chapter 3, pp. 93-136, Elsevier, Amsterdam, (1994).
Dominey, "Current State of the Art on Lithium Battery Electrolytes", Industrial Chemistry Library, vol. 5, Lithium Batteries: New Materials, Developments and Perspectives, Chapter 4, pp. 137165, Elsevier, Amsterdam, (1994).
Handbook of Batteries, Linden, 2nd edition, chapter 3, pp. 18-19, McGraw-Hill, New York, (1995).
Handbook of Batteries, Linden, 2nd edition, chapter 14, pp. 75-76, McGraw-Hill, New York, (1995).
Handbook of Batteries, Linden, 2nd edition, chapter 36, p. 2, McGraw-Hill, New York, (1995).

* cited by examiner

ELECTROCHEMICAL CELL INCLUDING ELECTROLYTE HAVING INSOLUBLE NITROGEN-CONTAINING MATERIAL AND BATTERY INCLUDING THE CELL

CROSS REFERENCE TO RELATED APPLICATIONS

This application is a continuation of and claims priority to U.S. patent application Ser. No. 14/286,731, filed May 23, 2014, which is a continuation of and claims priority to U.S. patent application Ser. No. 13/227,427 (Now U.S. Pat. No. 8,735,002) filed Sep. 7, 2011 and issued May 27, 2014, the disclosures of which are incorporated herein by reference in their entirety for all purposes.

FIELD OF INVENTION

The present invention relates generally to electrochemical cells and electrochemical cell components. More particularly, the invention relates to electrochemical cells including a nitrogen-containing compound, to components thereof, to batteries including the electrochemical cells, and to methods of forming and using the batteries, electrochemical cells and components.

BACKGROUND OF THE INVENTION

There has been considerable interest in recent years in developing high energy density batteries with lithium containing anodes. Lithium metal is particularly attractive as the anode of electrochemical cells because of its extremely light weight and high energy density, compared, for example, to anodes, such as lithium intercalated carbon anodes, where the presence of non-electroactive materials increases weight and volume of the anode, and thereby reduces the energy density of the cells, and to other electrochemical systems with, for example, nickel or cadmium anodes. These features are highly desirable for batteries for portable electronic devices such as cellular phones and laptop computers, as well as electric vehicles, military, and aerospace applications, where low weight is important.

Several types of cathode materials for lithium-anode batteries are known, and include cathode materials comprising sulfur-sulfur bonds, wherein high energy capacity and rechargeability are achieved from the electrochemical cleavage (via reduction) and reformation (via oxidation) of the sulfur-sulfur bonds. Sulfur-containing cathode materials, having sulfur-sulfur bonds, for use in electrochemical cells having lithium or sodium anodes, include elemental sulfur, organosulfur, and carbon-sulfur compositions.

During discharge of batteries that include a lithium anode and a sulfur-containing cathode, polysulfides form at the cathode of the batteries. Certain higher, soluble polysulfides may migrate to the anode and react with the anode, causing a reduction in battery performance. For example, the battery may exhibit self discharge, due to the presence of a redox shuttle mechanism, including the higher polysulfides. These polysulfides diffuse through the electrolyte to the anode where they are reduced to lower polysulfides that, in turn, diffuse back through the electrolyte to the cathode to be oxidized to higher polysulfides. This redox shuttle causes a continuous current flow in the cell, resulting in a depletion of the cell's stored capacity.

Accordingly, lithium-anode batteries with reduced self discharge are desired. In addition, it is generally desirable to have electrochemical cells with improved performance and properties, such as one or more of: the ability to fully charge, high utilization, high charge-discharge efficiency, and overcharge protection.

SUMMARY OF THE INVENTION

The present invention generally relates to electrochemical cells and batteries, and particularly, to: electrochemical cells including a lithium anode, a cathode, an electrolyte, and one or more relatively or substantially immobile or substantially insoluble nitrogen-containing compounds, and to batteries including such cells. The substantially insoluble nitrogen-containing compounds are thought to inhibit formation of and/or migration of soluble polysulfides and thereby increase the performance of the electrochemical cells. While the manner in which the present invention is believed to address the drawbacks of prior-art batteries is discussed in greater detail below, in general, the electrochemical cells (sometimes referred to herein as "cells") of the invention exhibit one or more of reduced self discharge, increased charge capacity, increased recharge ratio, increased utilization, and provide overcharge protection, as compared to similar cells without the nitrogen-containing compounds.

In accordance with various embodiments of the invention, an electrochemical cell includes an anode containing lithium, a cathode (e.g., containing sulfur), a separator, an electrolyte, and one or more substantially immobile and/or substantially insoluble nitrogen-containing compounds, which may form part of one or more of the anode, the cathode, the separator, and/or the electrolyte. During operation or cycling of the electrochemical cell, some of the substantially insoluble nitrogen-containing compounds may take part in reactions and become depleted; however, other substantially insoluble nitrogen-containing compounds may be available (e.g., through dissolution) and thus the concentration of the substantially insoluble nitrogen-containing compounds, in, for example, the electrolyte may remain relatively constant.

In accordance with various aspects of the embodiments, the substantially immobile and/or insoluble nitrogen-containing compound(s) are confined or restricted primarily to a particular area of the cell (e.g., the cathode or an anode/electrolyte interface). Restricting the mobility of the nitrogen-containing compound(s) may be beneficial, because a desired result (e.g., reduced self discharge, while maintaining high charge capacity and high energy density) may be achieved with relatively small quantities of the nitrogen-containing compounds, while mitigating any gas production that may otherwise result from the inclusion of similar, more mobile and/or soluble nitrogen-containing compounds within the electrochemical cell.

In accordance with various aspects of the embodiments of the invention, the one or more nitrogen-containing compounds include an N—O and/or an amine functional group. In accordance with further aspects, the one or more nitrogen-containing compounds include one or more monomers, oligomers and/or polymers selected from the group consisting of: polyethylene imine, polyphosphazene, polyvinylpyrolidone, polyacrylamide, polyaniline, polyelectrolytes (e.g., having a nitro aliphatic portion as a functional group), and amine groups, such as polyacrylamide, polyallylamine and polydiallyldimethylammonium chloride, polyimides, polybenzimidazole, polyamides, and the like.

In accordance with yet further aspects of embodiments of the invention, the cathode includes a binder comprising the one or more nitrogen-containing compounds.

In accordance with further aspects of embodiments of the invention, the cathode and/or anode includes one or more polymer layers including the one or more nitrogen-containing compounds.

An electrochemical cell according to various exemplary embodiments of the invention includes an electrolyte, an anode containing lithium and optionally, binder(s), coating(s) and/or layer(s), wherein the anode includes one or more nitrogen-containing compounds as described above, a cathode including sulfur, and a separator. The anode may include a binder including a nitrogen-containing compound and/or a polymer layer including a nitrogen-containing compound.

In accordance with yet additional embodiments of the invention, an electrochemical cell includes an electrolyte (e.g., liquid, solid, or gel) including one or more nitrogen-containing compounds as described above, an anode containing lithium, a cathode, and a separator. The electrolyte may be a gel or solid electrolyte that is a nitrogen-containing compound. Alternatively, the electrolyte is any suitable electrolyte material that includes one or more nitrogen-containing compounds that are substantially insoluble in the electrolyte.

In accordance with further embodiments of the invention, a cathode for use with an electrochemical cell includes a nitrogen-containing compound as described above. The cathode may include a binder including the one or more nitrogen-containing compounds, or the cathode may include one or more polymer layers including the one or more nitrogen-containing compounds.

In accordance with further embodiments of the invention, an anode for use in an electrochemical cell includes lithium, one or more nitrogen-containing compounds as described above, and, optionally, binder(s), coating(s) and/or layer(s). In accordance with various aspects of these embodiments, the one or more nitrogen-containing compounds include an N—O and/or an amine functional group. The anode may include a binder including a nitrogen-containing compound or the anode may include a polymer layer including a nitrogen-containing compound.

In accordance with further embodiments of the invention, a separator for use with an electrochemical cell includes a nitrogen-containing compound as described above.

In accordance with yet further embodiments of the invention, an electrolyte for use with an electrochemical cell includes a nitrogen-containing compound as described above.

And, in accordance with yet additional embodiments, a battery includes one or more electrochemical cells, wherein each cell includes an anode, a cathode, an electrolyte, and a separator, and wherein one or more of the anode, the cathode, the electrolyte, and the separator include a nitrogen-containing compound.

BRIEF DESCRIPTION OF THE DRAWING FIGURES

The exemplary embodiments of the present invention will be described in connection with the appended drawing figures, in which.

It will be appreciated that the figures are not necessarily drawn to scale. For example, the dimensions of some of the elements in the figures may be exaggerated relative to other elements to help to improve understanding of illustrated embodiments of the present invention.

DETAILED DESCRIPTION OF PREFERRED EMBODIMENTS OF THE INVENTION

The description of exemplary embodiments of the present invention provided below is merely exemplary and is intended for purposes of illustration only; the following description is not intended to limit the scope of the invention disclosed herein.

In accordance with various exemplary embodiments, the present invention provides an improved electrochemical cell, and various components thereof, suitable for a variety of applications, including, among others, automotive, medical device, portable electronics, aviation, military, and aerospace.

Electrochemical cells in accordance with various embodiments of the invention exhibit one or more of reduced self discharge, increased charge capacity, increased recharge ratio, increased utililization, and provide overcharge protection compared to typical lithium-anode cells. As set forth in more detail below, exemplary electrochemical cells include one or more substantially immobile or substantially insoluble nitrogen-containing compounds. Providing one or more nitrogen-containing compounds may be generally desirable to, for example, increase the charge capacity of the cell, achieve a high recharge ratio, and reduce self discharge of the cell. However, if the mobility and/or solubility of the nitrogen-containing compound is not restricted, the nitrogen-containing compound may form undesired levels of nitrogen gas and/or a thickening of the cell during a charge or discharge of the cell, which can result in a corresponding decrease in volumetric energy density of the cell. Accordingly, electrochemical cells and components thereof, in accordance with various embodiments of the invention, include substantially immobile and/or insoluble nitrogen-containing compounds.

Figure 1:
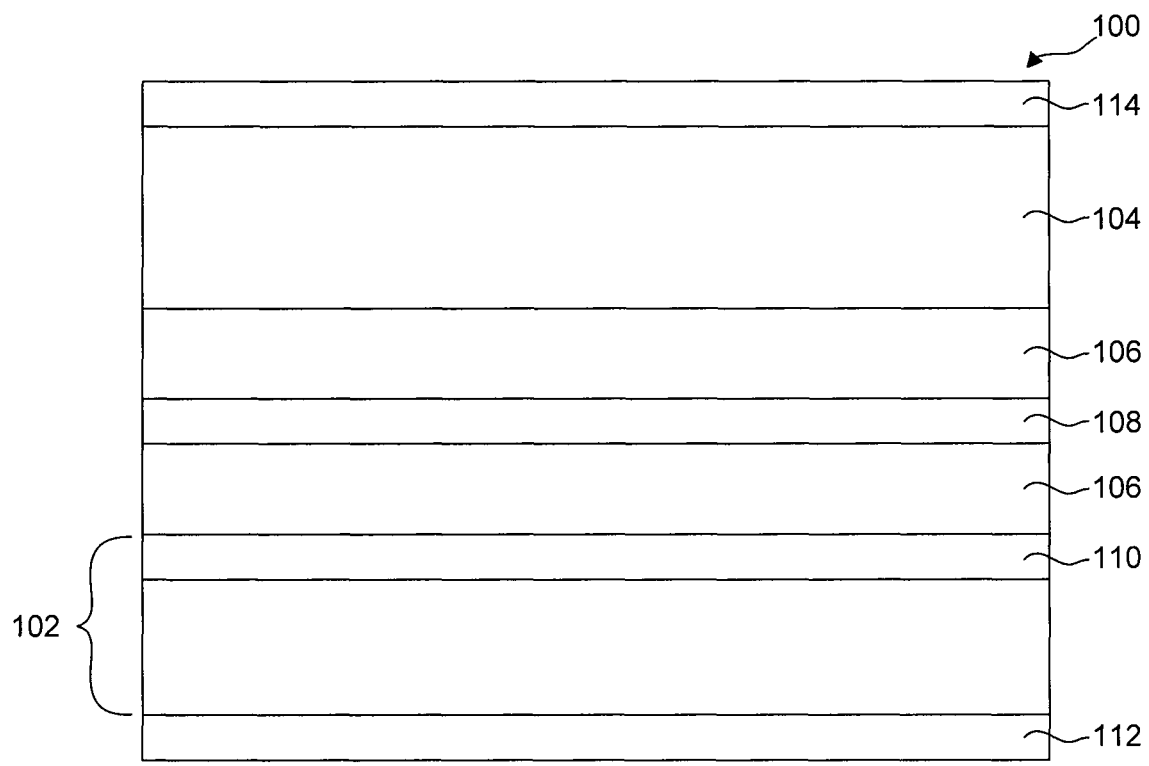
FIG. 1 illustrates an electrochemical cell including a nitrogen-containing compound in accordance with exemplary embodiments of the invention.

FIG. 1 illustrates an electrochemical cell 100, including a nitrogen-containing compound, in accordance with various exemplary embodiments of the invention. Cell 100 includes a cathode 102 (optionally including a cathode coating or layer 110), an anode 104, an electrolyte 106, a separator 108, and optionally includes current collectors 112, 114.

Cathode 102 includes an active material. Suitable cathode active materials for use in cathode 102 and electrochemical cells described herein include, but are not limited to, electroactive transition metal chalcogenides, electroactive conductive polymers, and electroactive sulfur-containing materials, and combinations thereof. In accordance with various exemplary embodiments, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. As set forth in more detail below, in accordance with various embodiments of the invention, cathode 102 additionally includes one or more nitrogen-containing materials.

In accordance with aspects of these embodiments, cathode 102 includes one or more electroactive sulfur materials and, optionally, one or more nitrogen-containing materials.

"Electroactive sulfur-containing materials," as used herein, relates to cathode active materials which comprise the element sulfur in any form, wherein the electrochemical activity involves the breaking or forming of sulfur-sulfur covalent bonds. Suitable electroactive sulfur-containing materials include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers. In accordance with additional aspects, the electroactive sulfur-containing materials include elemental sulfur. In accordance with other examples, the electroactive sulfur-containing material comprises a mixture of elemental sulfur and a sulfur-containing polymer.

"Nitrogen-containing materials," in accordance with various exemplary embodiments of the invention, include compounds including an N—O (e.g., nitro) and/or an amine functional group. In accordance with various exemplary aspects of these embodiments, the one or more nitrogen-containing compounds include one or more monomers, oligomers and/or polymers selected from the group consisting of: polyethylene imine, polyphosphazene, polyvinylpyrolidone, polyacrylamide, polyaniline, polyelectrolytes (e.g., having a nitro aliphatic portion as functional group), and amine groups, such as polyacrylamide, polyallylaminde and polydiallyldimethylammonium chloride, polyimides, polybenzimidazole, polyamides, and the like. The polyelectrolytes for use in accordance with various exemplary embodiments may be synthesized by, for example, direct nitration reactions with nitric acid and monomers, oligomers, and/or polymers having an aromatic group, such that, for example, nitro functional groups are incorporated into the monomers, oligomers, and/or polymers. Exemplary monomers, oligomers, and/or polymers suitable for the exemplary polyelectrolytes include polystyrenes, polyarylenes, such as polysulfones, polyether keytones, polyphenylenes, and the like.

Additionally or alternatively, the nitrogen-containing material may be a substantially insoluble compound (e.g., insoluble in the electrolyte). As used herein, "substantially insoluble" means less than 1% or less than 0.5% solubility of the compound in the electrolyte; all percents set forth herein are weight or mass percent, unless otherwise noted. Substantially insoluble compounds can be formed by, for example, attaching an insoluble cation, monomer, oligomer, or polymer, such as polystyrene or cellulose to a nitrogen-containing compound to form polynitrostyrene or nitrocellulose. One such substantially insoluble compound is octyl nitrate. Additionally or alternatively, compounds, such as salts of K, Mg, Ca, Sr, Al, aromatic hydrocarbons, or ethers as butyl ether may be added to the electrolyte to reduce the solubility of nitrogen-containing compounds, such as inorganic nitrate, organic nitrates, inorganic nitrites, organic nitrites, organic nitro compounds, and the like, such that otherwise soluble or mobile nitrogen-containing materials become substantially insoluble and/or substantially immobile in the electrolyte.

Another approach to reducing the mobility and/or solubility of nitrogen-containing materials, to form substantially insoluble nitrogen-containing compounds, includes attaching an N—O (e.g., nitro) and/or amine functional group to a long carbon chain, having, for example, about 8 to about 25 carbon atoms, to form micellar-type structures, with the active groups (e.g., nitrates) facing the electrolyte solution.

Cathode 102 may additionally include an electroactive transition metal chalcogenide, and, optionally, binders, electrolytes, and conductive additives. In accordance with various exemplary embodiments of the invention, the transition metal chalcogenide, binders, electrolytes, and/or conductive additives are functionalized (e.g., with a nitro or amine functional group) and are a nitrogen-containing compound. The electroactive material may be encapsulated or impregnated by the transition metal chalcogenide. In another embodiment, a coating of the electroactive sulfur-containing cathode material is encapsulated or impregnated by a thin coherent film coating of the cation transporting, anionic reduction product transport-retarding, transition metal chalcogenide composition. In yet another embodiment, a cathode includes particulate electroactive sulfur-containing cathode materials individually coated with an encapsulating layer of the cation transporting, anionic reduction product transport-retarding, transition metal chalcogenide composition. Other configurations are also possible.

In accordance with certain embodiments, the composite cathode is a particulate, porous electroactive transition metal chalcogenide composition, optionally containing nonelectroactive metal oxides, such as silica, alumina, and silicates, that is further impregnated with a soluble electroactive sulfur-containing cathode material. This may be beneficial in increasing the energy density and capacity compared with cathodes including electroactive sulfur-containing cathode material (e.g., electroactive organosulfur and carbon-sulfur cathode materials) only. In accordance with various aspects of these embodiments, the transition metal chalcogenide and/or the metal oxide may be functionalized with a nitrogen-containing group to be a nitrogen-containing compound.

Cathode 102 may further comprise one or more conductive fillers to provide enhanced electronic conductivity. Conductive fillers can increase the electrically-conductive properties of a material and may include, for example, conductive carbons such as carbon black (e.g., Vulcan XC72R carbon black, Printex XE2, or Akzo Nobel Ketjen EC-600 JD), graphite fibers, graphite fibrils, graphite powder (e.g., Fluka #50870), activated carbon fibers, carbon fabrics, non-activated carbon nanofibers. Other non-limiting examples of conductive fillers include metal coated glass particles, metal particles, metal fibers, nanoparticles, nanotubes, nanowires, metal flakes, metal powders, metal fibers, and metal mesh. In some embodiments, a conductive filler may include a conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Other conductive materials known to those of ordinary skill in the art can also be used as conductive fillers. The amount of conductive filler, if present, may be present in the range of 2 to 30% by weight of the cathode active layer. In accordance with various exemplary embodiments of the invention, the filler is functionalized with a nitrogen group, such as an N—O or amine group. Cathode 102 may also further comprise other additives including, but not limited to, metal oxides, aluminas, silicas, and transition metal chalcogenides, which may additionally or alternatively be functionalized with a nitrogen-containing group, such as an amine or N—O group.

Cathode 102 may also include a binder. In some embodiments, the binder material may be a polymeric material. Examples of polymer binder materials include, but are not limited to, polyvinylidene fluoride (PVDF)-based polymers, such as poly(vinylidene fluoride) (PVDF), PVF2 and its co- and terpolymers with hexafluoroethylene, tetrafluoroethylene, chlorotrifluoroethylene, poly(vinyl fluoride), polytetrafluoroethylenes (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene-propylene-diene (EPDM) rubbers, ethylene propylene diene terpolymers, styrene-butadiene rubbers (SBR), polyimides or ethylene-vinyl acetate copolymers. In some cases, the binder material may be substantially soluble in aqueous fluid carriers and may include, but is not limited to, cellulose derivatives, typically methylcellulose (MC), carboxy methylcellulose (CMC) and hydroxypropyl methylcellulose (HPMC), polyvinyl alcohol (PVA), polyacrylic acid salts, polyacryl amide (PA), polyvinyl pyrrolidone (PVP) and polyethylene oxides (PEO). In one set of embodiments, the binder material is poly(ethylene-co-propylene-co-5-methylene-2-norbornene) (EPMN), which may be chemically neutral (e.g., inert) towards cell components, including polysulfides. UV curable acrylates, UV curable methacrylates, and heat curable divinyl ethers can also be used. The amount of binder, if present, may be present in the range of 2 to 30% by weight of the cathode active layer. In accordance with various exemplary embodiments of the invention, the binder is functionalized with a nitrogen group, such as an N—O (e.g., nitro) or amine group.

In some embodiments, a cathode comprises a conductive porous support structure and a plurality of particles comprising sulfur (e.g., as an active species) substantially contained within the pores of the support structure.

A porous support structure can comprise any suitable form. In some instances, the porous support structure can comprise a porous agglomeration of discrete particles, within which the particles can be porous or non-porous. For example, the porous support structure might be formed by mixing porous or non-porous particles with a binder to form a porous agglomeration. Electrode active material might be positioned within the interstices between the particles and/or the pores within the particles (in cases where porous particles are employed) to form the inventive electrodes described herein.

In some embodiments, the porous support structure can be a "porous continuous" structure. A porous continuous structure, as used herein, refers to a continuous solid structure that contains pores within it, with relatively continuous surfaces between regions of the solid that define the pores. Examples of porous continuous structures include, for example, material that includes pores within its volume (e.g., a porous carbon particle, a metal foam, etc.). One of ordinary skill in the art will be capable of differentiating between a porous continuous structure and, for example, a structure that is not a porous continuous structure, but which is a porous agglomeration of discrete articles (where the interstices and/or other voids between the discrete particles would be considered pores) by, for example, comparing SEM images of the two structures. In accordance with various embodiments of the invention, the porous support includes functional nitrogen groups, such as N—O and/or amine groups and is a nitrogen-containing compound.

The porous support structure may be of any suitable shape or size. For example, the support structure can be a porous continuous particle with any suitable maximum cross-sectional dimension (e.g., less than about 10 mm, less than about 1 mm, less than about 500 microns, etc.). In some cases, the porous support structure (porous continuous or otherwise) can have a relatively large maximum cross-sectional dimension (e.g., at least about 500 microns, at least about 1 mm, at least about 10 mm, at least about 10 cm, between about 1 mm and about 50 cm, between about 10 mm and about 50 cm, or between about 10 mm and about 10 cm). In some embodiments, the maximum cross-sectional dimension of a porous support structure within an electrode can be at least about 50%, at least about 75%, at least about 90%, at least about 95%, at least about 98%, or at least about 99% of the maximum cross-sectional dimension of the electrode formed using the porous continuous structure.

By way of more particular examples, cathode 102 may include greater than about 40%, or about 45% to about 95%, or about 55% to about 75% electroactive sulfur-containing materials, and up to about 20%, or about 0.5% to about 4%, or about 1% to about 2% nitrogen-containing materials, for example, materials having functional N—O or amine groups, up to about 40%, or about 2% to about 30%, or about 10 to about 20% filler, and up to about 40%, or about 2% to about 30%, or about 10% to about 20% binder.

As previously stated, the nitrogen-containing materials may be a functionalized polymer, transition metal chalcogenide, metal oxide, filler, and/or binder. Additionally or alternatively, the nitrogen-containing material may be in the form of cathode coating 110, formed of, for example, one or more monomers, oligomers and/or polymers selected from one or more of the group consisting of: polyethylene imine, polyphosphazene, polyvinylpyrolidone, polyacrylamide, polyaniline, polyelectrolytes (e.g., having a nitro aliphatic portion as a functional group), and amine groups, such as polyacrylamide, polyallylaminde and polydiallyldimethylammonium chloride, polyimides, polybenzimidazole, polyamides, and the like.

Anode 104 may be of any structure suitable for use in a given electrochemical cell with a given cathode. Suitable active materials, comprising lithium, for anode 104 include, but are not limited to, lithium metal, such as lithium foil and lithium deposited onto a substrate, such as a plastic film, and lithium alloys, such as lithium-aluminum alloys and lithium-tin alloys.

In certain embodiments, the thickness of the anode may vary from, e.g., about 2 to 200 microns. For instance, the anode may have a thickness of less than 200 microns, less than 100 microns, less than 50 microns, less than 25 microns, less than 10 microns, or less than 5 microns. The choice of the thickness may depend on cell design parameters such as the excess amount of lithium desired, cycle life, and the thickness of the cathode electrode. In one embodiment, the thickness of the anode active layer is in the range of about 2 to 100 microns (e.g., about 5 to 50 microns, about 5 to 25 microns, or about 10 to 25 microns).

The layers of an anode may be deposited by any of a variety of methods generally known in the art, such as physical or chemical vapor deposition methods, extrusion, or electroplating. Examples of suitable physical or chemical vapor deposition methods include, but are not limited to, thermal evaporation (including, but not limited to, resistive, inductive, radiation, and electron beam heating), sputtering (including, but not limited to, diode, DC magnetron, RF, RF magnetron, pulsed, dual magnetron, AC, MF, and reactive), chemical vapor deposition, plasma enhanced chemical vapor deposition, laser enhanced chemical vapor deposition, ion plating, cathodic arc, jet vapor deposition, and laser ablation.

Deposition of the layers may be carried out in a vacuum or inert atmosphere to minimize side reactions in the deposited layers which could introduce impurities into the layers or which may affect the desired morphology of the layers. In some embodiments, anode active layers and the layers of multi-layered structures are deposited in a continuous fashion in a multistage deposition apparatus.

Alternatively, where the anode comprises a lithium foil, or a lithium foil and a substrate, these can be laminated together by a lamination process as known in the art, to form an anode layer.

Figure 2:
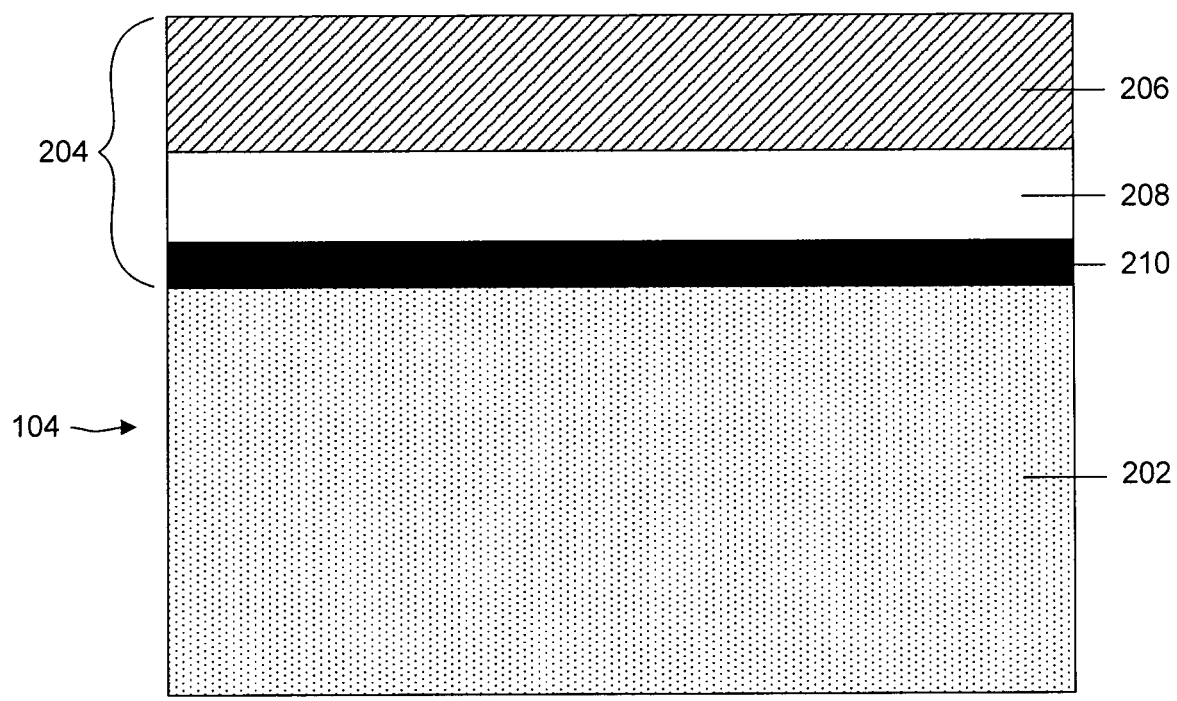
FIG. 2 illustrates an anode in accordance with various exemplary embodiments of the invention.

FIG. 2 illustrates anode 104, including a base electrode material layer 202, (e.g., comprising an electroactive material such as lithium) and a multi-layered structure 204, in accordance with various exemplary embodiments of the invention. In some cases herein, the anode is referred to as an "anode based material," "anode active material," or the like, and the anode along with any protective structures are referred to collectively as the "anode." All such descriptions are to be understood to form part of the invention. In this particular embodiment, multi-layered structure 204 includes a single-ion conductive layer or a single-ion conductive layer 206, a polymeric layer 208 positioned between the base electrode material and the single-ion conductive material, and a separation layer 210 (e.g., a layer resulting from plasma treatment of the electrode) positioned between the electrode and the polymeric layer. As discussed in more detail below, various components of anode 104 may be functionalized with a nitrogen group, in accordance with various exemplary embodiments of the invention.

Multi-layered structure 204 can allow passage of lithium ions and may impede the passage of other components that may otherwise damage the anode. Multilayered structure 204 can reduce the number of defects and thereby force at least some of the surface of the base electrode material to participate in current conduction, impede high current density-induced surface damage, and/or act as an effective barrier to protect the anode from certain species (e.g., electrolyte and/or polysulfides), as discussed in greater detail below.

In some embodiments, single-ion conductive layer 206 material is non-polymeric. In certain embodiments, the single-ion conductive material layer is defined in part or in whole by a metal layer that is highly conductive toward lithium and minimally conductive toward electrons. In other words, the single-ion conductive material may be one selected to allow lithium ions, but to impede electrons or other ions, from passing across the layer. The metal layer may comprise a metal alloy layer, e.g., a lithiated metal layer. The lithium content of the metal alloy layer may vary from about 0.5% by weight to about 20% by weight, depending, for example, on the specific choice of metal, the desired lithium ion conductivity, and the desired flexibility of the metal alloy layer. Suitable metals for use in the single-ion conductive material include, but are not limited to, Al, Zn, Mg, Ag, Pb, Cd, Bi, Ga, In, Ge, Sb, As, and Sn. Sometimes, a combination of metals, such as the ones listed above, may be used in a single-ion conductive material.

In other embodiments, single-ion conductive layer 206 material may include a ceramic layer, for example, a single ion conducting glass conductive to lithium ions. Suitable glasses include, but are not limited to, those that may be characterized as containing a "modifier" portion and a "network" portion, as known in the art. The modifier may include a metal oxide of the metal ion conductive in the glass. The network portion may include a metal chalcogenide such as, for example, a metal oxide or sulfide. Single-ion conductive layers may include glassy layers comprising a glassy material selected from the group consisting of lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, $LiO$, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof. In one embodiment, the single-ion conductive layer comprises a lithium phosphorus oxynitride in the form of an electrolyte.

A thickness of single-ion conductive material layer 206 (e.g., within a multilayered structure) may vary over a range from about 1 nm to about 10 microns. For instance, the thickness of the single-ion conductive material layer may be between 1-10 nm thick, between 10-100 nm thick, between 100-1000 nm thick, between 1-5 microns thick, or between 5-10 microns thick. The thickness of a single-ion conductive material layer may be no greater than, e.g., 10 microns thick, no greater than 5 microns thick, no greater than 1000 nm thick, no greater than 500 nm thick, no greater than 250 nm thick, no greater than 100 nm thick, no greater than 50 nm thick, no greater than 25 nm thick, or no greater than 10 nm thick. In some cases, the single-ion conductive layer has the same thickness as a polymer layer in a multi-layered structure.

Single-ion conductive layer 206 may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on any factor related to the layer being deposited, such as the nature of the material being deposited or the thickness of the layer.

In some embodiments, suitable polymer layers for use in a multi-layered structure (e.g., such as polymer layer 208) include polymers that are highly conductive towards lithium and minimally conductive towards electrons. Examples of such polymers include ionically conductive polymers, sulfonated polymers, and hydrocarbon polymers. The selection of the polymer will be dependent upon a number of factors including the properties of electrolyte and cathode used in the cell. Suitable ionically conductive polymers include, e.g., ionically conductive polymers known to be useful in solid polymer electrolytes and gel polymer electrolytes for lithium electrochemical cells, such as, for example, polyethylene oxides.

Suitable sulfonated polymers may include, e.g., sulfonated siloxane polymers, sulfonated polystyrene-ethylene-butylene polymers, and sulfonated polystyrene polymers. Suitable hydrocarbon polymers may include, e.g., ethylene-propylene polymers, polystyrene and/or polymers.

Polymer layers 208 of a multi-layered structure 204 can also include crosslinked polymer materials formed from the polymerization of monomers such as alkyl acrylates, glycol acrylates, polyglycol acrylates, polyglycol vinyl ethers, and/or polyglycol divinyl ethers. For example, one such crosslinked polymer material is polydivinyl poly(ethylene glycol). The crosslinked polymer materials may further comprise salts, for example, lithium salts, to enhance ionic conductivity. In one embodiment, the polymer layer of the multi-layered structure comprises a crosslinked polymer.

Other classes of polymers that may be suitable for use in a polymer layer include, but are not limited to, polyamines (e.g., poly(ethylene imine) and polypropylene imine (PPI)); polyamides (e.g., polyamide (Nylon), poly(e-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexyl-cynaoacrylate)); polyacetals; polyolefins (e.g., poly (butenel), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes).

The polymer materials listed above and described herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity.

The thickness of polymer layer 208 may vary, e.g., over a range from about 0.1 microns to about 100 microns. The thickness of the polymer layer may depend on, for example, whether it is positioned adjacent the anode or cathode, whether a separator is also present in the battery, and/or the number of polymer layers in the battery. For instance, the thickness of the polymer layer may be between 0.1-1 microns thick, between 1-5 microns thick, between 5-10 microns thick, between 10-30 microns thick, or between 30-50 microns thick, between 50-70 microns thick, or between 50-100 microns thick. In some embodiments, the thickness of a polymer layer may be no greater than, e.g., 50 microns thick, no greater than 25 microns thick, no greater than 10 microns thick, no greater than 5 microns thick, no greater than 2.5 microns thick, no greater than 1 micron thick, no greater than 0.5 microns thick, or no greater than 0.1 microns thick.

A polymer layer may be deposited by method such as electron beam evaporation, vacuum thermal evaporation, laser ablation, chemical vapor deposition, thermal evaporation, plasma assisted chemical vacuum deposition, laser enhanced chemical vapor deposition, jet vapor deposition, and extrusion. The polymer layer may also be deposited by spin-coating techniques. The technique used for depositing polymer layers may depend on any suitable variable, such as the type of material being deposited, or the thickness of the layer. In accordance with various embodiments of the invention, the polymer layer is functionalized with a nitrogen group as described herein.

As noted in the description with respect to anode 104, illustrated in FIG. 2, in one particular embodiment, multi-layered structure 204, separating base electrode material layer 202 from electrolyte 106, includes polymer layer 208 adjacent either base electrode material layer 202 or separation layer 210. In other arrangements, a polymer layer need not be the first layer adjacent the base electrode material layer or separation layer. Various arrangements of layers, including various multi-layered structures, are described below, in which the first layer adjacent the base electrode material layer may or may not be the polymer layer. It is to be understood that in all arrangements where any particular arrangement of layers is shown, alternate ordering of layers is within the scope of the invention. Notwithstanding this, one aspect of the invention includes the particular advantages realized by a non-brittle polymer immediately adjacent either the base electrode material layer or separation layer.

A multi-layered structure can include various numbers of polymer/single-ion conductive pairs as needed. Generally, a multi-layered structure can have n polymer/single-ion conductive pairs, where n can be determined based on a particular performance criteria for a cell. For example, n can be an integer equal to or greater than 1, or equal to or greater than 2, 3, 4, 5, 6, 7, 10, 15, 20, 40, 60, 100, or 1000, etc.

In other embodiments, a multi-layered structure may include a greater number of polymer layers than single-ion conductive layers, or a greater number of single-ion conductive layers than polymer layers. For example, a multi-layered structure may include n polymer layers and n+1 single-ion conductive layers, or n single-ion conductive layers and n+1 polymer layers, where n is greater than or equal to 2. For example, n may equal 2, 3, 4, 5, 6, or 7, or higher. However, as described above, it is immediately adjacent at least one polymer layer and, in at least 50%, 70%, 90%, or 95% of the ion-conductive layers, such layers are immediately adjacent a polymer layer on either side.

Figure 3:
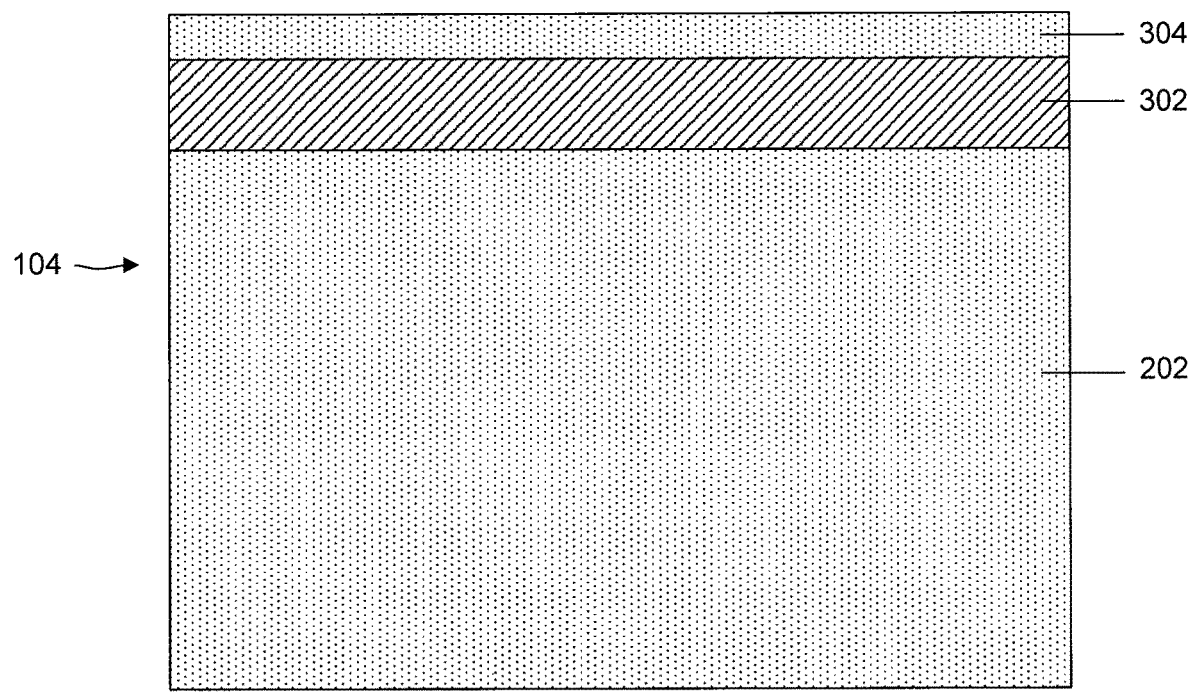
FIG. 3 illustrates an anode in accordance with various additional exemplary embodiments of the invention.
Figure 4:
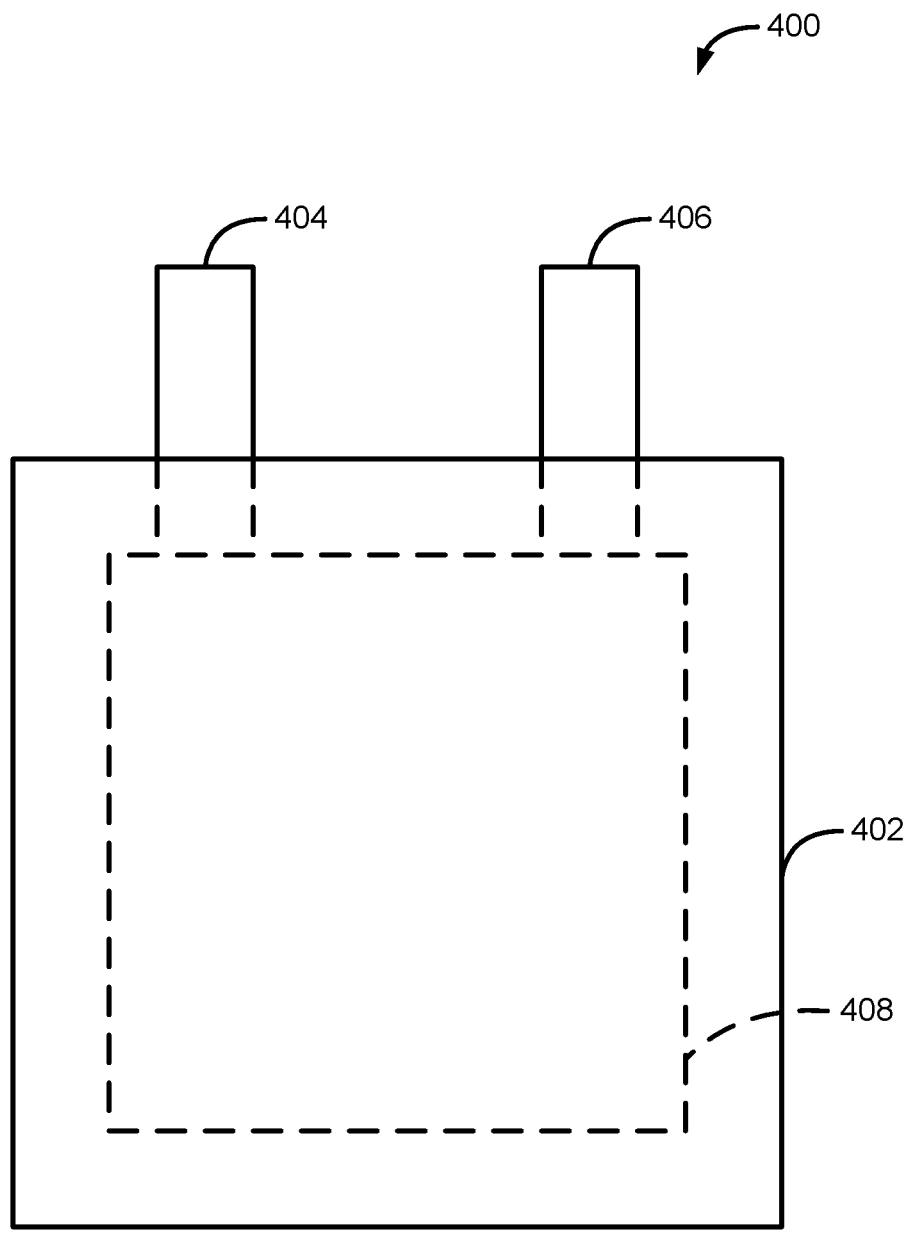
FIG. 4 illustrates a battery in accordance with exemplary embodiments of the disclosure.

Another embodiment includes an embedded layer (e.g., of a protective layer such as a single-ion conductive material layer) positioned between two layers of base electrode materials. This is referred to as a "lamanode" structure. FIG. 3 illustrates an exemplary anode 104 including a first layer of a base electrode material layer 202 (e.g., lithium, also referred to as a Li reservoir), embedded layer 302, and a second layer 304 comprising the base electrode material (a working Li layer). As illustrated in FIG. 3, second layer 304 is positioned between base electrode material layer 202 and electrolyte 106. Second layer 304 may be either in direct contact with the electrolyte, or in indirect contact with the electrolyte through some form of a surface layer (e.g., an electrode stabilization or multi-layered structure such as one described herein). The function of the bi-layer anode structure, with each base electrode material layer separated by an embedded layer 302, will become clearer from the description below. It is noted that although embedded layer 302 is illustrated and described as "embedded" in this description, it is noted that the layer need not be partially or fully embedded. In many or most cases, embedded layer 302 is a substantially thin, two-sided structure coated on each side by base electrode material, but not covered by base electrode material at its edges.

In general, in operation of the arrangement shown in FIG. 3, some or all of second layer 304 of the anode is "lost" from the anode upon discharge (when it is converted to lithium ion which moves into the electrolyte). Upon charge, when lithium ion is plated as lithium metal onto the anode, it is plated as second layer 304 (or at least some portion of second layer 304) above embedded layer 302. Those of ordinary skill in the art are aware that in electrochemical cells such as those described herein, there is a small amount of overall lithium loss on each charge/discharge cycle of the cell. In the arrangement illustrated in FIG. 3, the thickness of second layer 304 (or the mass of second layer 304) can be selected such that most or all of second layer 304 is lost upon full discharge of the cell (full "satisfaction" of the cathode; the point at which the cathode can no longer participate in a charging process due to limitations that would be understood by those of ordinary skill in the art).

In certain embodiments, embedded layer 302 is selected to be one that is conductive to lithium ions. The embedded layer can shield the bottom Li layer from damage as the high Li+ flux of the first cycle damages the top Li layer surface. Accordingly, once all of second layer 304 is consumed in a particular discharge cycle, further discharge results in oxidation of lithium from base electrode material layer 202, passage of lithium ion through embedded layer 302, and release of lithium ion into the electrolyte. Of course, second layer 304 need not be of a particular mass such that all or nearly all of it is consumed on first discharge. It may take several discharge/charge cycles, and inherent small amounts of lithium loss through each cycle, to result in the need to draw lithium from base electrode material layer 202 through embedded layer 302 and into the electrolyte.

In some embodiments, embedded layer 302 may have a thickness between 0.01-1 microns, and may depend on, e.g., the type of material used to form the embedded layer and/or the method of depositing the material. For example, the thickness of the embedded layer may be between 0.01-0.1 microns, between 0.1-0.5 microns, or between 0.5-1 micron. In other embodiments, thicker embedded layers are included. For example, the embedded layer can have a thickness between 1-10 microns, between 10-50 microns, or between 50-100 microns.

In some cases, the embedded material can be formed of a polymer, e.g., including ones listed above that are lithium ion conductive. The polymer film can be deposited using techniques such as vacuum based PML, VMT or PECVD techniques. In other cases, an embedded layer can comprise a metal or semiconductor material. Metals and semi-conductors can be, for example, sputtered.

By way of particular examples, anode 104 includes lithium and at least one layer of a nitrogen-containing material. The nitrogen-containing material may be a functionalized surface having, for example, and amine or nitro group or include one or more monomers, oligomers and/or polymers selected from the group consisting of: polyethylene imine, polyphosphazene, polyvinylpyrolidone, polyacrylamide, polyaniline, polyelectrolytes (e.g., having a nitro aliphatic portion as a functional group), and amine groups, such as polyacrylamide, polyallylaminde and polydiallyldimethylammonium chloride, polyimides, polybenzimidazole, polyamides, and the like. A percent of nitrogen-containing compound an part of the anode may range from up to about 20%, about 0.5% to about 5%, or about 1 to about 2%.

Electrolyte 106 can function as a medium for the storage and transport of ions, and in the special case of solid electrolytes and gel electrolytes, these materials may additionally function as a separator (e.g., separator 108) between anode 104 and cathode 102. Any suitable liquid, solid, or gel material capable of storing and transporting ions between the anode and the cathode may be used. Electrolyte 106 may be electronically non-conductive to prevent short circuiting between anode 104 and cathode 102.

The electrolyte can comprise one or more ionic electrolyte salts to provide ionic conductivity and one or more liquid electrolyte solvents, gel polymer materials, or polymer materials.

Suitable non-aqueous electrolytes may include organic electrolytes comprising one or more materials selected from the group consisting of liquid electrolytes, gel polymer electrolytes, and solid polymer electrolytes.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinylether, diethylene glycol divinylether, triethylene glycol divinylether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. Mixtures of the solvents described herein can also be used.

In some embodiments, specific liquid electrolyte solvents that may be favorable towards anode 104 include, but are not limited to, 1,1-dimethoxyethane (1,1-DME), 1,1diethoxyethane, 1,2-diethoxyethane, diethoxymethane, dibutyl ether, anisole or methoxybenzene, veratrole or 1,2-dimethoxybenzene, 1,3-dimethoxybenzene, tbutoxyethoxyethane, 2,5-dimethoxytetrahydrofurane, cyclopentanone ethylene ketal, and combinations thereof. Specific liquid electrolyte solvents that may be favorable towards the cathode 102 (e.g., have relatively high polysulfide solubility, and/or can enable high rate capability and/or high sulfur utilization) include, but are not limited to, dimethoxyethane (DME, 1,2-dimethoxyethane) or glyme, diglyme, triglyme, tetraglyme, polyglymes, sulfolane, 1,3-dioxolane (DOL), tetrahydrofurane (THF), acetonirile, and combinations thereof.

Specific mixtures of solvents include, but are not limited to, 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. The weight ratio of the two solvents in the mixtures may vary from about 5 to 95 to 95 to 5. In some embodiments, a solvent mixture comprises dioxolanes (e.g., greater than 40% by weight of dioxolanes).

Liquid electrolyte solvents can also be useful as plasticizers for gel polymer electrolytes. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes described herein include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$Sx), and lithium salts of organic ionic polysulfides (LiS$_x$R)$_n$, where x is an integer from 1 to 20, n is an integer from 1 to 3, and R is an organic group, and the like range of concentrations of the ionic lithium salts in the solvent may be used such as from about 0.2 m to about 2.0 m (m is moles/kg of solvent). In some embodiments, a concentration in the range between about 0.5 m to about 1.5 m is used. The addition of ionic lithium salts to the solvent is optional in that upon discharge of Li/S cells the lithium sulfides or polysulfides formed typically provide ionic conductivity to the electrolyte, which may make the addition of ionic lithium salts unnecessary. Furthermore, if an ionic N—O additive such as an inorganic nitrate, organic nitrate, inorganic nitrite, or polyelectrolyte is used, it may provide ionic conductivity to the electrolyte in which case no additional ionic lithium electrolyte salts may be needed.

As described herein, additives that may reduce or prevent formation of impurities and/or depletion of electrochemically active materials, including electrodes and electrolyte materials, during charge/discharge of the electrochemical cell, may be incorporated into electrochemical cells described herein.

In some cases, an additive such as an organometallic compound may be incorporated into the electrolyte and may reduce or prevent interaction between at least two components or species of the cell to increase the efficiency and/or lifetime of the cell. Typically, electrochemical cells (e.g., rechargeable batteries) undergo a charge/discharge cycle involving deposition of metal (e.g., lithium metal) on the surface of the anode (e.g., a base electrode material) upon charging and reaction of the metal on the anode surface to form metal ions, upon discharging. The metal ions may diffuse from the anode surface into an electrolyte material connecting the cathode with the anode. The efficiency and uniformity of such processes may affect cell performance. For example, lithium metal may interact with one or more species of the electrolyte to substantially irreversibly form lithium-containing impurities, resulting in undesired depletion of one or more active components of the cell (e.g., lithium, electrolyte solvents). The incorporation of certain additives within the electrolyte of the cell have been found, in accordance with certain embodiments described herein, to reduce such interactions and to improve the cycling lifetime and/or performance of the cell.

In some embodiments, the additive may be any suitable species, or salt thereof, capable of reducing or preventing the depletion of active materials (e.g., electrodes, electrolyte) within a cell, for example, by reducing formation of lithium-containing impurities within the cell, which may be formed via reaction between lithium and an electrolyte material. In some embodiments, the additive may be an organic or organometallic compound, a polymer, salts thereof, or combinations thereof. In some embodiments, the additive may be a neutral species. In some embodiments, the additive may be a charged species. Additives described herein may also be soluble with respect to one or more components of the cell (e.g., the electrolyte). In some cases, the additive may be an electrochemically active species. For example, the additive may be a lithium salt which may reduce or prevent depletion of lithium and/or the electrolyte, and may also serve as an electrochemically active lithium salt.

The additive may be present within (e.g., added to) the electrochemical cell in an amount sufficient to inhibit (e.g., reduce or prevent) formation of impurities and/or depletion of the active materials within the cell. "An amount sufficient to inhibit formation of impurities and/or depletion of the active materials within the cell," in this context, means that the additive is present in a large enough amount to affect (e.g., reduce) formation of impurities and/or the depletion of the active materials, relative to an essentially identical cell lacking the additive. For example, trace amounts of an additive may not be sufficient to inhibit depletion of active materials in the cell. Those of ordinary skill in the art may determine whether an additive is present in an amount sufficient to affect depletion of active materials within an electrochemical device. For example, the additive may be incorporated within a component of an electrochemical cell, such as the electrolyte, and the electrochemical cell may be monitored over a number of charge/discharge cycles to observe any changes in the amount, thickness, or morphology of the electrodes or electrolyte, or any changes in cell performance.

Determination of the amount of change in the active materials over a number of charge/discharge cycles may determine whether or not the additive is present in an amount sufficient to inhibit formation of impurities and/or depletion of the active materials. In some cases, the additive may be added to the electrochemical cell in an amount sufficient to inhibit formation of impurities and/or depletion of active materials in the cell by at least 50%, 60%, 70%, 80%, 90%, or, in some cases, by 100%, as compared to an essentially identical cell over an essentially identical set of charge/discharge cycles, absent the additive.

In some cases, the additive may have the same chemical structure as a product of a reaction between lithium of the anode and a solvent within the electrolyte, such as an ester, ether, acetal, ketal, or the like. Examples of such solvents include, but are not limited to, 1,2-dimethoxyethane and 1,2-dioxolane.

In some cases, the additives described herein may be associated with a polymer. For example, the additives may be combined with a polymer molecule or may be bonded to a polymer molecule. In some cases, the additive may be a polymer. For example, the additive may have the formula, R'—(O—Li)n, wherein R' is alkyl or alkoxyalkyl. In some embodiments, an additive is added to an electrochemical cell, wherein the additive is an electrochemically active species. For example, the additive can serve as electrolyte salt and can facilitate one or more processes during charge and/or discharge of the cell. In some cases, the additive may be substantially soluble or miscible with one or more components of the cell. In some cases, the additive may be a salt which is substantially soluble with respect to the electrolyte. The additive may serve to reduce or prevent formation of impurities within the cell and/or depletion of the active materials, as well as facilitate the charge-discharge processes within the cell.

Incorporation of additives described herein may allow for the use of smaller amounts of lithium and/or electrolyte within an electrochemical cell, relative to the amounts used in essentially identical cells lacking the additive. As described above, cells lacking the additives described herein may generate lithium-containing impurities and undergo depletion of active materials (e.g., lithium, electrolyte) during charge-discharge cycles of the cell. In some cases, the reaction which generates the lithium-containing impurity may, after a number of charge-discharge cycles, stabilize and/or begin to self-inhibit such that substantially no additional active material becomes depleted and the cell may function with the remaining active materials. For cells lacking additives as described herein, this "stabilization" is often reached only after a substantial amount of active material has been consumed and cell performance has deteriorated. Therefore, in some cases, a relatively large amount of lithium and/or electrolyte has often been incorporated within cells to accommodate for loss of material during consumption of active materials, in order to preserve cell performance.

Accordingly, incorporation of additives as described herein may reduce and/or prevent depletion of active materials such that the inclusion of large amounts of lithium and/or electrolyte within the electrochemical cell may not be necessary. For example, the additive may be incorporated into a cell prior to use of the cell, or in an early stage in the lifetime of the cell (e.g., less than five charge-discharge cycles), such that little or substantially no depletion of active material may occur upon charging or discharging of the cell. By reducing and/or eliminating the need to accommodate for active material loss during charge-discharge of the cell, relatively small amounts of lithium may be used to fabricate cells and devices as described herein. In some embodiments, devices described herein comprise an electrochemical cell having been charged and discharged less than five times in its lifetime, wherein the cell comprises an anode comprising lithium, a cathode, and an electrolyte, wherein the anode comprises no more than five times the amount of lithium which can be ionized during one full discharge cycle of the cell. In some cases, the anode comprises no more than four, three, or two times the amount of lithium which can be ionized during one full discharge cycle of the cell.

In some embodiments, when an additive is added into the electrolyte that is added to the electrochemical cell during fabrication, the additive may first be introduced into the cell as a part of other cell components from where it can enter the electrolyte. The additive may be incorporated into liquid, gel or solid polymer electrolytes. In some embodiments, the additive may be incorporated in the cathode formulation or into the separator in the fabrication process, as long as it is included in a manner such that it will enter the electrolyte in sufficient concentrations. Thus, during discharge and charging of the cell, the additive incorporated in the cathode formulation or the separator may dissolve, at least partially, in the electrolyte.

In some embodiments, an N—O compound can be used as an additive. N—O compounds for use as additives include, but are not limited to, families such as inorganic nitrates, organic nitrates, inorganic nitrites, organic nitrites, organic nitro compounds, compounds with negatively, neutral and positively charged NOx groups, and other organic N—O compounds. Examples of inorganic nitrates that may be used include, but are not limited to, lithium nitrate, potassium nitrate, cesium nitrate, barium nitrate, and ammonium nitrate. Examples of organic nitrates that may be used include, but are not limited to, dialkyl imidazolium nitrates, and guanidine nitrate. Examples of inorganic nitrites that may be used include, but are not limited to, lithium nitrite, potassium nitrite, cesium nitrite, and ammonium nitrite. Examples of organic nitrites that may be used include, but are not limited to, ethyl nitrite, propyl nitrite, butyl nitrite, pentyl nitrite, and octyl nitrite. Examples of organic nitro compounds that may be used include, but are not limited to, nitromethane, nitropropane, nitrobutanes, nitrobenzene, dinitrobenzene, nitrotoluene, dinitrotoluene, nitropyridine, and dinitropyridine. Examples of other organic N—O compounds that may be used include, but are not limited to, pyridine N-oxide, alkylpyridine N-oxides, and tetramethyl piperidine N-oxyl (TEMPO). These and other additives may stabilize lithium/electrolyte reactivity, may increase rate of polysulfide dissolution and/or increase sulfur utilization.

When included in electrolyte 106, concentrations of the N—O additive in the electrolytes may be from about 0.02 m to about 2.0 m (e.g., from about 0.1 m to about 1.5 m, or from about 0.2 m to about 1.0 m). Concentrations of the ionic N—O additive when used in embodiments that do not include added lithium salts may vary from about 0.2 m to about 2.0 m.

In some embodiments, electrochemical cells described herein are adapted and arranged such that electrolyte compositions are separated to different portions of the cell. Such separation can result in isolation of a particular species from a portion of the electrochemical cell, or at least reduction in level of exposure of that portion to the species, for a variety of purposes, including prevention of deposition of certain solids on or within electrodes of devices of this type.

Separation of electrolyte compositions described herein can be carried out in a variety of manners. In one set of techniques, a polymer (which can be a gel) is positioned at a location in the device where it is desirable for a particular electrolyte solvent, which has relatively high affinity for the polymer, to reside. In another set of techniques, two different polymers are positioned in the device at particular locations where two different electrolyte solvents, each having a relatively greater affinity for one of the polymers, are desirably positioned. Similar arrangements can be constructed using more than two polymers. Relatively immiscible electrolyte solvents can be used, and positioned relative to each other, and to other components of the device, so as to control exposure of at least one component of the device to a particular species, by exploiting the fact that the species may be more highly soluble in one solvent than the other. Techniques described generally above, or other techniques, or any combination, can be used toward this general separation methodology.

As described herein, an electrochemical cell may include an anode having lithium (e.g., lithium metal, a lithium intercalation compound, or a lithium alloy) as the active anode species and a cathode having sulfur as the active cathode species. In these and other embodiments, suitable electrolytes for the lithium batteries can comprise a heterogeneous electrolyte including a first electrolyte solvent (e.g., dioxolane (DOL)) that partitions towards the anode and is favorable towards the anode (referred to herein as an "anode-side electrolyte solvent") and a second electrolyte solvent (e.g., 1,2 dimethoxyethane (DME)) that partitions towards the cathode and is favorable towards the cathode (and referred to herein as an "cathode-side electrolyte solvent"). In some embodiments, the anode-side electrolyte solvent has a relatively lower reactivity towards lithium metal and may be less soluble to polysulfides (e.g., $Li_2Sx$, where $x>_2$) than the cathode-side electrolyte solvent. The cathode-side electrolyte solvent may have a relatively higher solubility towards polysulfides, but may be more reactive towards lithium metal. By separating the electrolyte solvents during operation of the electrochemical cell such that the anode-side electrolyte solvent is present disproportionately at the anode and the cathode-side electrolyte solvent is present disproportionately at the cathode, the electrochemical cell can benefit from desirable characteristics of both electrolyte solvents (e.g., relatively low lithium reactivity of the anode-side electrolyte solvent and relatively high polysulfide solubility of the cathode-side electrolyte solvent). Specifically, anode consumption can be decreased, buildup of insoluble polysulfides (i.e., "slate," lower-order polysulfides such as $Li_2Sx$, where $x<_3$, e.g., $Li_2S_2$ and $Li_2S$) at the cathode can be decreased, and as a result, the electrochemical cell may have a longer cycle life. Furthermore, the batteries described herein may have a high specific energy (e.g., greater than 400 Wh/kg), improved safety, and/or may be operable at a wide range of temperatures (e.g., from $-70°$ C. to $+75°$ C.). Disproportionate presence of one species or solvent, versus another, at a particular location in a cell means that the first species or solvent is present, at that location (e.g., at a surface of a cell electrode) in at least a 2:1 molar or weight ratio, or even a 5:1, 10:1, 50:1, or 100:1 or greater ratio.

As used herein, a "heterogeneous electrolyte" is an electrolyte including at least two different liquid solvents (oftentimes referred to herein as first and second electrolyte solvents, or anode-side and cathode-side electrolyte solvents). The two different liquid solvents may be miscible or immiscible with one another, although in many aspects of the invention, electrolyte systems include one or more solvents that are immiscible (or can be made immiscible within the cell) to the extent that they will largely separate and at least one can be isolated from at least one component of the cell. A heterogeneous electrolyte may be in the form of a liquid, a gel, or a combination thereof.

As certain embodiments described herein involve a heterogeneous electrolyte having at least two electrolyte solvents that can partition during operation of the electrochemical cell, one goal may be to prevent or decrease the likelihood of spontaneous solvent mixing, i.e., generation of an emulsion of two immiscible liquids. As described in more detail below, this may be achieved in some embodiments by "immobilizing" at least one electrolyte solvent at an electrode (e.g., an anode) by forming, for example, a polymer gel electrolyte, glassy-state polymer, or a higher viscosity liquid that resides disproportionately at that electrode.

In some embodiments, an anode includes a polymer layer adjacent a multilayered structure of the anode (e.g., positioned as an outer layer). The polymer layer can, in some instances, be in the form of a polymer gel or a glassy-state polymer. The polymer layer may have an affinity to one electrolyte solvent of a heterogeneous electrolyte such that during operation of the electrochemical cell, a first electrolyte solvent resides disproportionately at the anode, while a second electrolyte solvent is substantially excluded from the polymer layer and is present disproportionately at the cathode. For example, a first electrolyte solvent may reside predominately at a polymer layer adjacent the anode. Because the first electrolyte solvent is present closer to the anode, it is generally chosen to have one or more characteristics such as low reactivity to lithium (e.g., enable high lithium cycle-ability), reasonable lithium ion conductivity, and relatively lower polysulfide solubility than the second electrolyte solvent (since polysulfides can react with lithium). The second electrolyte solvent may be present disproportionately at the cathode and, for example, may reside substantially in a separator, a polymer layer adjacent the cathode, and/or in a base electrode material layer of the cathode (e.g., cathode active material layer). For example, a second electrolyte solvent may reside predominately at a polymer layer adjacent the cathode, predominately in a base electrode material layer, or in combinations thereof. In some instances, the second electrolyte solvent is essentially free of contact with the anode. The second electrolyte solvent may have characteristics that favor better cathode performance such as high polysulfide solubility, high rate capability, high sulfur utilization, and high lithium ion conductivity, and may have a wide liquid state temperature range. In some cases, the second electrolyte solvent has a higher reactivity to lithium than the first electrolyte solvent. It may be desirable, therefore, to cause the second electrolyte solvent to be present at the cathode (i.e., away from the anode) during operation of the electrochemical cell, thereby effectively reducing its concentration, and reactivity, at the anode.

As described above, the first electrolyte solvent of a heterogeneous electrolyte may be present disproportionately at the anode by residing in a polymer layer positioned adjacent a multi-layered structure. Accordingly, the material composition of the polymer layer may be chosen such that the polymer has a relatively higher affinity to (high solubility in) the first electrolyte solvent compared to the second electrolyte solvent. For instance, in some embodiments, the polymer layer is prepared in the form of a gel by mixing a monomer, a first electrolyte solvent, and, optionally, other components (e.g., a crosslinking agent, lithium salts, etc.) and disposing this mixture on the anode. The monomer can be polymerized by various methods (e.g., using a radical initiator, ultra violet radiation, an electron beam, or catalyst (e.g., an acid, base, or transition metal catalyst)) to form a gel electrolyte. Polymerization may take place either before or after disposing the mixture on the anode. After assembling the other components of the cell, the cell can be filled with the second electrolyte solvent. The second electrolyte solvent may be excluded from the polymer layer (e.g., due to the high affinity of the polymer with the first electrolyte solvent already present in the polymer layer and/or due to immiscibility between the first and second electrolyte solvents). In some instances, the second electrolyte solvent may fill the spaces (e.g., pores) within the separator and/or the cathode. In some embodiments, the cathode can be dried prior to assembly of the electrochemical cell to facilitate this process. Additionally and/or alternatively, the cathode (e.g., base electrode material layer of the cathode) may include a polymer that has a high affinity for the second electrolyte solvent. The polymer in the base electrode material layer may be in the form of particles. In some cases, the second electrolyte can reside at least partially in a polymer layer positioned adjacent the cathode.

In another embodiment, a polymer layer is formed at the anode and is dried prior to assembly of the cell. The cell can then be filled with a heterogeneous electrolyte including the first and second electrolyte solvents. If the polymer layer is chosen such that it has a higher affinity towards the first electrolyte solvent (and/or the separator and/or cathode may have a higher affinity towards the second electrolyte solvent), at least portions of the first and second electrolyte solvents can partition once they are introduced into the cell. In yet another embodiment, partitioning of the first and second electrolyte solvents can take place after commencement of first discharge of the cell. For example, as heat is produced while operating the battery, the affinity between the polymer layer and the first electrolyte solvent can increase (and/or the affinity between the separator and/or cathode and the second electrolyte solvent can increase). Thus, a greater degree of partitioning of the electrolyte solvents can occur during operation of the cell. Additionally, at lower temperatures, the effect may be irreversible such that the first electrolyte solvent is trapped within the polymer layer, and the second electrolyte solvent is trapped within the pores of the separator and/or cathode.

In some cases, the components of the electrochemical cell (e.g., the polymer layer) may be pretreated (e.g., with heat) prior to use to affect the desired degree of polymer/electrolyte solvent interaction. Other methods of partitioning the electrolyte solvents are also possible.

In another embodiment, the polymer layer is deposited at the anode and the anode (including the polymer layer) is exposed to a first electrolyte solvent. This exposure can cause the first electrolyte solvent to be absorbed in the polymer. The cell can be formed by positioning a cathode adjacent the anode such that the polymer layer is positioned between the anode and cathode. The cathode can then be exposed to a second electrolyte solvent, e.g., such that at least a portion of the second electrolyte solvent is absorbed in the cathode. In other embodiments, the cathode can be exposed to the second electrolyte solvent prior to assembly of the anode and cathode. Optionally, the cathode may include a polymer layer that preferentially absorbs the second electrolyte solvent more than the first electrolyte solvent. In some embodiments, e.g., by choosing appropriate polymer(s) and/or materials used to form the anode and/or cathode, at least portions of the first and second electrolyte solvents can be separated within the cell. For instance, a higher proportion of the first electrolyte solvent may reside at the anode and a higher proportion of the second electrolyte solvent may reside at the cathode.

In yet another embodiment, an electrochemical cell does not include a polymer layer specifically used for partitioning at the anode or the cathode. A separator may include a different composition near the anode side compared to the cathode side of the separator, the anode side having a higher affinity for the first solvent and the cathode side having a higher affinity for the second solvent. Additionally and/or alternatively, the second electrolyte solvent may be present disproportionately at the cathode by, for example, fabricating the cathode such that it contains a component that has a high affinity for the second electrolyte solvent.

In some of the embodiments described herein, an electrochemical cell may be filled with a heterogeneous electrolyte including first and second electrolyte solvents and partitioning of the electrolyte solvents can occur after commencement of first discharge of the cell, e.g., due to the differential solubility of the polysulfides in the electrolyte solvents. For example, as more polysulfides are generated during operation of the cell, the dissolution of the polysulfides in the more favorable second electrolyte solvent can cause it to become immiscible with the first. Thus, in some embodiments, the first and second electrolyte solvents may be miscible before, but immiscible after, commencement of first discharge of the battery. The second electrolyte solvent containing the dissolved polysulfides may be present disproportionately at the cathode by, for example, embodiments described herein such as having a polymer layer at the anode that preferentially associates with the first electrolyte solvent, and/or a polymer layer at the cathode that preferentially associates with the second electrolyte solvent. In other embodiments, the first and second electrolyte solvents are miscible before commencement of first discharge of the cell, but the electrolyte solvents become immiscible due to heating of the electrolyte solvents during operation of the cell. In yet other embodiments, the first and second electrolyte solvents are immiscible before and after commencement of first discharge of the cell. For instance, the first and second electrolyte solvents may be inherently immiscible at room temperature, as well as during operation of the battery.

Advantageously, in some embodiments, two immiscible liquid electrolyte solvents, one present disproportionately and the anode and the other present disproportionately and the cathode, do not cause additional mechanical stress to the battery as a solid membrane may, during electrode volume changes that occur during cell cycling.

As described herein, in some embodiments a polymer that has an affinity for an electrolyte solvent can be dispersed within the cathode (e.g., in a base electrode material layer). For instance, the cathode active material layer may include a polymeric material in powder form incorporated therein. In some cases, the polymeric material is an insoluble component in the cathode layer. For example, the polymeric material may be insoluble in the solvent used to dissolve the cathode active material. The polymer can be obtained, or modified, to have a suitable particle size and dispersed throughout the cathode by incorporation in the cathode slurry. One advantage of incorporating an insoluble polymer with the cathode active material layer is that the polymer can remain as discrete particles that do not coat, adsorb, and/or block the active carbon sites. In other cases, however, the polymeric material can be dissolved, or partially dissolved, as the cathode binder in the cathode layer.

In certain embodiments including one or more polymers dispersed within a layer (e.g., insoluble polymeric particles dispersed in a cathode), the polymers can have any suitable particle size. The average diameter of the polymer particles may be, for example, less than or equal to 100 microns, less than or equal to 70 microns, less than or equal to 50 microns, less than or equal to 30 microns, less than or equal to 15 microns, less than or equal to 10 microns, or less than or equal to 5 microns. Of course, a range of polymer particle sizes may be used. For example, in one embodiment, the polymer particles may have a size of d10=5, d50=12, and d97=55 microns, meaning 10% of the particles were below 5 microns, 50% of the particles below 12 microns, and only 3% of the particles measured above 55 microns.

Suitable polymer materials for partitioning electrolyte solvents may include the polymers described herein, such as those mentioned above regarding suitable polymeric materials for polymer layers (e.g., as part of a multi-layer protective structure). In some embodiments, a single polymer layer is in contact with an anode or cathode of an electrochemical cell; however, in other embodiments, more than one polymer layer can be associated with an anode or cathode. For instance, a polymer layer in contact with an anode (or cathode) may be formed of more than one polymer layer coated in sequence. The sequence of polymers may include, for example, a first polymer and a second polymer, the first and second polymers being the same or different. Additional polymers, e.g., fourth, fifth, or sixth polymer layers, can also be used. Each of the polymer layers may optionally include one or more fillers or other components (e.g., crosslinking agents, lithium salts, etc.).

The thickness of a polymer layer may vary, e.g., over a range from about 0.1 microns to about 100 microns. The thickness of the polymer layer may depend on, for example, whether it is positioned adjacent the anode or cathode, whether a separator is also present in the battery, and/or the number of polymer layers in the cell. For instance, the thickness of the polymer layer may be between 0.1-1 microns thick, between 1-5 microns thick, between 5-10 microns thick, between 10-30 microns thick, or between 30-50 microns thick, between 50-70 microns thick, or between 50-100 microns thick. In some embodiments, the thickness of a polymer layer may be no greater than, e.g., 50 microns thick, no greater than 25 microns thick, no greater than 10 microns thick, no greater than 5 microns thick, no greater than 2.5 microns thick, no greater than 1 micron thick, no greater than 0.5 microns thick, or no greater than 0.1 microns thick.

As set forth above, in accordance with further exemplary embodiments of the invention, electrolyte 106 includes a nitrogen-containing group attached to an insoluble cation, monomer, oligomer, or polymer to form an insoluble nitrogen-containing material in the electrolyte. Compounds, such as salts of K, Mg, Ca, Sr, Al, aromatic hydrocarbons, or ethers as butyl ether may additionally or alternatively be added to the electrolyte to reduce the solubility of nitrogen-containing compounds, such as inorganic nitrate, organic nitrates, inorganic nitrites, organic nitrites, organic nitro compounds, and the like, such that any of the nitrogen-containing compounds described herein become substantially insoluble nitrogen-containing compounds as defined herein.

In accordance with various exemplary embodiments of the invention, electrolyte 106 includes about 30% to about 90%, or about 50% to about 85%, or about 60% to about 80% solvents, about 0.1% to about 10%, or about 0.5% to about 7.5%, or about 1% to about 5% N—O additive, and about 1% to about 20%, or about 1% to about 10%, or about 1% to about 5% substantially insoluble nitrogen-containing material, and up to about 20%, or about 4% to about 20%, or about 6% to about 16%, or about 8% to about 12% LiTFSI.

Referring again to FIG. 1, in accordance with various embodiments of the invention, electrochemical cell 100 includes separator 108 interposed between cathode 102 and anode 104. The separator may be a solid non-conductive or insulative material which separates or insulates the anode and the cathode from each other preventing short circuiting. The pores of the separator may be partially or substantially filled with electrolyte.

Separators may be supplied as porous free standing films which are interleaved with the anodes and the cathodes during the fabrication of cells. Alternatively, the porous separator layer may be applied directly to the surface of one of the electrodes.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous xerogel layer, for example, a microporous pseudo-boehmite layer, which may be provided either as a free-standing film or by a direct coating application on one of the electrodes. Solid electrolytes and gel electrolytes may also function as a separator in addition to their electrolyte function and which permits the transport of ions between the anode and the cathode.

In accordance with various embodiments of the invention, separator 108 may include one or more nitrogen-containing materials, such as one or more monomers, oligomers and/or polymers selected from the group consisting of: polyethylene imine, polyphosphazene, polyvinylpyrolidone, polyacrylamide, polyaniline, polyelectrolytes (e.g., having a nitro aliphatic portion as a functional group), and amine groups, such as polyacrylamide, polyallylaminde and polydiallyldimethylammonium chloride, polyimides, polybenzimidazole, polyamides, and the like.

The composition of the nitrogen-containing material in separator 108 may be up to 100% or about 30% to about 60%. The separator may be up to about 20%, or about 4% to about 6% of the electrochemical cell weight.

An electrochemical cell may include any suitable current collector 112, 114. A current collector is useful in efficiently collecting the electrical current generated throughout an electrode and in providing an efficient surface for attachment of the electrical contacts leading to the external circuit. A wide range of current collectors are known in the art. Suitable current collectors may include, for example, metal foils (e.g., aluminum foil), polymer films, metallized polymer films (e.g., aluminized plastic films, such as aluminized polyester film), electrically conductive polymer films, polymer films having an electrically conductive coating, electrically conductive polymer films having an electrically conductive metal coating, and polymer films having conductive particles dispersed therein.

In some embodiments, the current collector includes one or more conductive metals such as aluminum, copper, chromium, stainless steel and nickel or an alloy or alloys of such metals. Other current collectors may include, for example, expanded metals, metal mesh, metal grids, expanded metal grids, metal wool, woven carbon fabric, woven carbon mesh, non-woven carbon mesh, or carbon felt. Furthermore, a current collector may be electrochemically inactive or may comprise an electroactive material. For example, a current collector may include a material that is used as an electroactive material layer (e.g., as an anode or a cathode such as those described herein).

A current collector may be positioned on a surface by any suitable method such as lamination, sputtering, or vapor deposition. In some cases, a current collector is provided as a commercially available sheet that is laminated with one or more electrochemical cell components. In other cases, a current collector is formed during fabrication of the electrode by depositing a conductive material on a suitable surface. Side or edge current collectors may also be incorporated into electrochemical cells described herein.

A current collector may have any suitable thickness. For instance, the thickness of a current collector may be, for example, between 0.1 and 0.5 microns thick, between 0.1 and 0.3 microns thick, between 0.1 and 2 microns thick, between 1-5 microns thick, between 5-10 microns thick, between 5-20 microns thick, or between 10-50 microns thick. In certain embodiments, the thickness of a current collector is, e.g., about 20 microns or less, about 12 microns or less, about 10 microns or less, about 7 microns or less, about 5 microns or less, about 3 microns or less, about 1 micron or less, about 0.5 micron or less, or about 0.3 micron or less. In some embodiments, the use of a release layer during fabrication of an electrode can allow the formation or use of a very thin current collector, which can reduce the overall weight of the cell, thereby increasing the cell's energy density.

As previously stated, electrochemical cells in accordance with various embodiments of the invention may include one or more nitrogen-containing compounds in one or more components of a cell. For example, the cell may include a cathode, an anode, a separator between the anode and cathode, a non-aqueous electrolyte, and a nitrogen-containing material in one or more of the group consisting of the anode, the cathode, and the separator. Alternatively, the cell may include a cathode, an anode, optionally a separator between the anode and cathode, a non-aqueous electrolyte, and a nitrogen-containing material in one or more of the group consisting of the anode, the cathode, the separator, and the electrolyte, wherein, the nitrogen-containing compound is substantially insoluble in the electrolyte, and may be selected from the group consisting of include one or more monomers, oligomers and/or polymers selected from the group consisting of: polyethylene imine, polyphosphazene, polyvinylpyrolidone, polyacrylamide, polyaniline, polyelectrolytes (e.g., having a nitro aliphatic portion as a functional group), and amine groups, such as polyacrylamide, polyallylaminde and polydiallyldimethylammonium chloride, polyimides, polybenzimidazole, and polyamides. The nitrogen-containing materials may be substantially insoluble in the electrolyte, attached to a moiety that is substantially insoluble in the electrolyte, and/on form part of the cathode, anode, separator, or portion(s) thereof, such that the cell portion includes a functional group including nitrogen, which may be substantially insoluble in the electrolyte. The exemplary cells may additionally include N—O additives in the electrolyte. By way of examples, the anode; the cathode; the separator; the electrolyte; the anode and cathode; the separator and one or both of the anode and cathode; the electrolyte and one or both of the anode and cathode; the anode, the cathode and the separator; the anode, the cathode and the electrolyte, the anode, the cathode, the electrolyte, and the separator may include the nitrogen-containing materials as described herein.

Batteries, such as battery 400, in accordance with various exemplary embodiments of the invention, include one or more cells 408 as described herein, current collectors (e.g., collectors 112, 114), leads or terminals (e.g., a positive lead 404 and a negative lead 406) electrically coupled to the collectors, and a casing or housing 402, which encapsulates at least a portion of the cell.

The present invention has been described above with reference to a number of exemplary embodiments and examples. It should be appreciated that the particular embodiments shown and described herein are illustrative of the preferred embodiments of the invention and its best mode, and are not intended to limit the scope of the invention as set forth in the claims. It will be recognized that changes and modifications may be made to the embodiments described herein without departing from the scope of the present invention. These and other changes or modifications are intended to be included within the scope of the present invention, as expressed in the following claims and the legal equivalents thereof.

The invention claimed is:

1. An electrochemical cell, comprising:
   a cathode;
   an anode comprising lithium;
   a porous separator between the anode and cathode; and
   a non-aqueous electrolyte comprising about 50 wt % to about 85 wt % of one or more non-aqueous solvents, about 0.2 m (moles/kg of solvent) to about 2.0 m of one or more lithium salts, and about 1 wt % to about 5 wt % of a substantially insoluble nitrogen-containing material, wherein the solubility of the substantially insoluble nitrogen-containing material in the electrolyte is less than 1%,
   wherein at least a portion of the non-aqueous electrolyte is within pores of the separator, and
   wherein the substantially insoluble nitrogen-containing material comprises one or more of a nitro compound, polydiallyldimethylammonium chloride, a nitrate or nitrite in combination with a salt, aromatic hydrocarbon, or ether added to the electrolyte to make the nitrate or nitrite insoluble in the electrolyte, a compound including an N—O or amine functional group attached to a carbon chain comprising about 8 to about 25 carbon atoms configured to form micelle structures comprising the N—O or amine functional groups, polyethylene imine, polyvinylpyrolidone, polyacrylamide, polyaniline, and polybenzimidazole.

2. The electrochemical cell of claim 1, further comprising about 0.5 wt % to about 7.5 wt % of an additive comprising an N—O compound.

3. The electrochemical cell of claim 1, wherein the substantially insoluble nitrogen containing material comprises a nitro compound, polydiallyldimethylammonium chloride, polyamide or a nitrate or nitrite in combination with a salt, aromatic hydrocarbon, or ether added to the electrolyte to make the nitrate or nitrite insoluble in the electrolyte, or a compound including an N—O or amine functional group attached to a carbon chain comprising about 8 to about 25 carbon atoms configured to form micelle structures comprising the N—O or amine functional groups.

4. A battery comprising:
   a housing;
   a positive lead;
   a negative lead; and
   one or more electrochemical cells as defined in claim 1.

5. An electrochemical cell, comprising:
   a cathode comprising an electroactive material;
   an anode comprising lithium;
   a separator between the anode and cathode; and
   a non-aqueous electrolyte comprising about 60 wt % to about 80 wt % of one or more non-aqueous solvents, about 0.2 m (moles/kg of solvent) to about 2.0 m of one or more lithium salts, about 1 wt % to about 10 wt % of a substantially insoluble nitrogen-containing material, wherein the solubility of the substantially insoluble nitrogen-containing material in the electrolyte is less than 1%,
   wherein the separator comprises pores,
   wherein at least a portion of the non-aqueous electrolyte is within the pores, and
   wherein the substantially insoluble nitrogen-containing material comprises one or more of a nitro compound, polydiallyldimethylammonium chloride, a nitrate or nitrite in combination with a salt, aromatic hydrocarbon, or ether added to the electrolyte to make the nitrate or nitrite insoluble in the electrolyte, a compound including an N—O or amine functional group attached to a carbon chain comprising about 8 to about 25 carbon atoms configured to form micelle structures comprising the N—O or amine functional group, polyethylene imine, polyvinylpyrolidone, polyacrylamide, polyaniline, and polybenzimidazole.

6. The electrochemical cell of claim 5, wherein the solubility of the substantially insoluble nitrogen-containing material in the non-aqueous electrolyte is less than 0.5 percent.

7. The electrochemical cell of claim 5, wherein the substantially insoluble nitrogen-containing material comprises the compound including the N—O or amine functional group attached to the carbon chain comprising about 8 to about 25 carbon atoms configured to form micelle structures comprising the N—O or amine functional group.

8. The electrochemical cell of claim 5, wherein the substantially insoluble nitrogen-containing material comprises a compound selected from the group consisting of polynitrostyrene, nitrocellulose, and octyl nitrate.

9. The electrochemical cell of claim 5, wherein the substantially insoluble nitrogen-containing material comprises polyethylene imine.

10. The electrochemical cell of claim 5, wherein the substantially insoluble nitrogen-containing material comprises the nitrate or nitrite in combination with a salt, aromatic hydrocarbon, or ether added to the electrolyte to make the nitrate or nitrite insoluble in the electrolyte.

11. The electrochemical cell of claim 5, wherein the substantially insoluble nitrogen-containing material comprises the nitro compound.

12. The electrochemical cell of claim 5, wherein the substantially insoluble nitrogen-containing material comprises a nitrogen group attached to an insoluble material selected from the group consisting of a cation, a monomer, an oligomer, and a polymer.

13. The electrochemical cell of claim 5, wherein the cathode includes the substantially insoluble nitrogen-containing material.

14. The electrochemical cell of claim 5, wherein the cathode comprises a binder comprising the substantially insoluble nitrogen-containing material.

15. The electrochemical cell of claim 5, wherein the anode includes the substantially insoluble nitrogen-containing material.

16. The electrochemical cell of claim 5, wherein the non-aqueous electrolyte comprises a compound selected from the group consisting of a potassium salt, a magnesium salt, a calcium salt, a strontium salt, an aluminum salt, an aromatic hydrocarbon, and an ether.

17. The electrochemical cell of claim 5, wherein the one or more lithium salts comprise LiTFSI, and wherein the electrolyte comprises about 60 wt % to about 80 wt % of the one or more non-aqueous solvents, about 1 wt % to about 5 wt % of an N—O additive, about 1 wt % to about 5 wt % of the substantially insoluble nitrogen-containing material, and up to about 20 wt % LiTFSI.

18. The electrochemical cell of claim 5, further comprising about 1 wt % to about 5 wt % of an additive comprising an N—O compound.

19. The electrochemical cell of claim 3, wherein the N—O compound is selected from the group consisting of inorganic nitrates, organic nitrates, inorganic nitrites, organic nitrites, organic nitro compounds, and compounds with one or more of negatively, neutral and positively charged nitrogen oxide groups.

20. A battery comprising:
a housing;
a positive lead;
a negative lead; and
one or more electrochemical cells as defined in claim 5.

* * * * *